("(12) United States Patent
Takahashi et al.

(10) Patent No.: US 12,537,429 B2
(45) Date of Patent: Jan. 27, 2026

(54) VIBRATION GENERATING DEVICE WITH MOVABLE BODY, GUIDE MEMBER, MAGNETIC MEMBER AROUND COIL

(71) Applicant: ALPS ALPINE CO., LTD., Tokyo (JP)

(72) Inventors: Takenori Takahashi, Miyagi (JP); Kazunari Takahashi, Miyagi (JP); Yuki Ikezoe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 337 days.

(21) Appl. No.: 18/315,045

(22) Filed: May 10, 2023

(65) Prior Publication Data

US 2023/0275496 A1   Aug. 31, 2023

Related U.S. Application Data

(63) Continuation of application No. PCT/JP2021/043280, filed on Nov. 25, 2021.

(30) Foreign Application Priority Data

Dec. 25, 2020   (JP) ................................ 2020-217439

(51) Int. Cl.
   *H02K 33/12*   (2006.01)
(52) U.S. Cl.
   CPC .................................. *H02K 33/12* (2013.01)
(58) Field of Classification Search
   CPC ........ H02K 35/00; H02K 35/02; H02K 35/04; H02K 35/06; H02K 7/1869; H02K 7/1876;
   (Continued)

(56) References Cited

U.S. PATENT DOCUMENTS 4,346,318 A * 8/1982 Shtrikman ............. H02K 33/06
                                              310/12.24
4,831,292 A * 5/1989 Berry ..................... H02K 33/06
                                              310/23
(Continued)

FOREIGN PATENT DOCUMENTS

JP       2014-183644       9/2014
WO       2019/151232       8/2019

OTHER PUBLICATIONS

International Search Report for PCT/JP2021/043280 mailed on Dec. 28, 2021.

*Primary Examiner* — Maged M Almawri
(74) *Attorney, Agent, or Firm* — IPUSA, PLLC

(57) ABSTRACT

A vibration generating device includes: a stationary body; a movable body housed in the stationary body; a guide member configured to guide the movable body so that the movable body is reciprocally movable in the stationary body along a left-and-right direction; a magnetic flux-generating member fixed to the movable body and configured to generate a magnetic flux along an up-and-down direction; a coil fixed to the stationary body to cross the magnetic flux and includes electrically conductive wires extending along a front-and-back direction and being juxtaposed along the left-and-right direction; and a magnetic member fixed to the stationary body and disposed at an outer side of the coil. The magnetic member is disposed to generate an attractive force to attract the movable body located at a position off a center of a movable range of the movable body, to the center of the movable range of the movable body.

10 Claims, 23 Drawing Sheets

(58) Field of Classification Search
CPC ...... H02K 7/1892; H02K 33/00; H02K 33/02; H02K 33/16
USPC ........ 310/12.01, 81, 80, 321, 28–30, 36–37, 310/40 MM, 15–29
See application file for complete search history.

(56) References Cited

U.S. PATENT DOCUMENTS

| | | | | |
|---|---|---|---|---|
| 5,587,615 | A * | 12/1996 | Murray | H02K 33/16 310/15 |
| 6,914,351 | B2 * | 7/2005 | Chertok | H02K 35/02 310/12.26 |
| 7,633,189 | B2 * | 12/2009 | Iwasa | H02K 41/03 310/15 |
| 7,671,493 | B2 * | 3/2010 | Takashima | G06F 3/016 310/15 |
| 7,687,943 | B2 * | 3/2010 | Lunde | H02K 7/1846 310/58 |
| 8,278,786 | B2 * | 10/2012 | Woo | H02K 33/16 310/15 |
| 8,358,039 | B2 * | 1/2013 | Trumper | G01Q 10/04 310/12.24 |
| 8,456,032 | B2 * | 6/2013 | Hochberg | F03B 13/00 290/43 |
| 8,648,502 | B2 * | 2/2014 | Park | H02K 33/16 310/15 |
| 8,704,387 | B2 * | 4/2014 | Lemieux | F03G 7/08 290/1 R |
| 8,941,251 | B2 * | 1/2015 | Zuo | H02K 35/02 290/1 R |
| 8,941,272 | B2 * | 1/2015 | Hong | H02K 33/18 310/15 |
| 9,024,489 | B2 * | 5/2015 | Akanuma | H02K 33/16 310/15 |
| 9,225,265 | B2 * | 12/2015 | Oh | G06F 3/016 |
| 9,240,267 | B2 * | 1/2016 | Nagahara | H02K 35/02 |
| 9,306,429 | B2 * | 4/2016 | Akanuma | H02K 33/16 |
| 9,543,816 | B2 * | 1/2017 | Nakamura | H02K 33/16 |
| 9,748,827 | B2 * | 8/2017 | Dong | H02K 33/16 |
| 9,948,170 | B2 * | 4/2018 | Jun | H02K 33/00 |
| 10,033,257 | B2 * | 7/2018 | Zhang | H02K 33/12 |
| 10,063,128 | B2 * | 8/2018 | Wang | H02K 33/16 |
| 10,160,010 | B2 * | 12/2018 | Chun | H02K 33/16 |
| 10,307,791 | B2 * | 6/2019 | Xu | B06B 1/045 |
| 10,328,461 | B2 * | 6/2019 | Xu | B06B 1/045 |
| 10,404,150 | B2 * | 9/2019 | Swanson | H02K 35/06 |
| 10,447,133 | B2 * | 10/2019 | Jin | H02K 33/18 |
| 10,483,451 | B2 * | 11/2019 | Wang | H10N 30/01 |
| 10,486,196 | B2 * | 11/2019 | Chai | B06B 1/045 |
| 10,491,090 | B2 * | 11/2019 | Zu | H02K 33/16 |
| 10,581,355 | B1 * | 3/2020 | Dyson | H02P 6/005 |
| 10,596,596 | B2 * | 3/2020 | Ling | H04R 9/066 |
| 10,674,278 | B2 * | 6/2020 | Zhou | H04R 9/025 |
| 10,763,732 | B2 * | 9/2020 | Liu | H02K 33/18 |
| 10,886,827 | B2 * | 1/2021 | Liu | H02K 33/14 |
| 10,930,838 | B1 * | 2/2021 | Miesner | H02N 2/043 |
| 10,931,185 | B2 * | 2/2021 | Tang | H02K 33/12 |
| 10,998,487 | B1 * | 5/2021 | Miesner | H10N 35/80 |
| 11,050,334 | B2 * | 6/2021 | Mori | H02K 33/18 |
| 11,522,429 | B2 * | 12/2022 | Takahashi | H02K 33/06 |
| 2003/0127916 | A1 * | 7/2003 | Godkin | H02K 41/0356 310/12.16 |
| 2006/0044093 | A1 * | 3/2006 | Ohta | H02K 99/20 335/220 |
| 2008/0174187 | A1 * | 7/2008 | Erixon | H02K 33/16 310/15 |
| 2009/0096299 | A1 * | 4/2009 | Ota | B06B 1/045 310/25 |
| 2009/0267423 | A1 * | 10/2009 | Kajiwara | H02K 33/02 310/38 |
| 2010/0213773 | A1 * | 8/2010 | Dong | H02K 33/16 310/25 |
| 2011/0018364 | A1 * | 1/2011 | Kim | H02K 33/18 310/20 |
| 2011/0068640 | A1 * | 3/2011 | Choi | H02K 5/04 310/25 |
| 2011/0089772 | A1 * | 4/2011 | Dong | H02K 33/16 310/25 |
| 2011/0115311 | A1 * | 5/2011 | Dong | H02K 33/16 310/28 |
| 2011/0133577 | A1 * | 6/2011 | Lee | H02K 33/18 310/15 |
| 2012/0153748 | A1 * | 6/2012 | Wauke | H02K 33/16 310/25 |
| 2012/0187780 | A1 * | 7/2012 | Bang | H02K 33/16 310/25 |
| 2012/0242086 | A1 * | 9/2012 | Yang | H02K 35/02 290/50 |
| 2012/0242175 | A1 * | 9/2012 | Yang | H02K 35/02 310/30 |
| 2012/0313459 | A1 * | 12/2012 | Zhang | H02K 33/18 310/25 |
| 2013/0093266 | A1 * | 4/2013 | Hong | H02K 33/18 29/446 |
| 2013/0099600 | A1 * | 4/2013 | Park | B06B 1/045 310/15 |
| 2013/0169071 | A1 * | 7/2013 | Endo | H02K 33/12 310/25 |
| 2014/0054983 | A1 * | 2/2014 | Moon | H02K 33/16 310/28 |
| 2014/0062224 | A1 * | 3/2014 | Kim | H02K 33/16 310/15 |
| 2014/0346901 | A1 * | 11/2014 | Hayward | H02K 15/14 310/25 |
| 2016/0173990 | A1 * | 6/2016 | Park | H04R 9/043 381/354 |
| 2017/0033657 | A1 * | 2/2017 | Mao | H02K 33/16 |
| 2017/0110920 | A1 * | 4/2017 | Mao | H02K 1/34 |
| 2017/0288519 | A1 * | 10/2017 | Kim | H02K 33/16 |
| 2018/0021812 | A1 * | 1/2018 | Akanuma | H02K 33/00 310/25 |
| 2018/0358878 | A1 * | 12/2018 | Liu | H02K 1/34 |
| 2019/0044425 | A1 * | 2/2019 | Zu | H02K 33/02 |
| 2020/0044538 | A1 * | 2/2020 | Tang | H02K 33/18 |
| 2020/0212786 | A1 * | 7/2020 | Ling | H02K 33/18 |
| 2020/0358347 | A1 | 11/2020 | Nakamura et al. | |
| 2020/0412221 | A1 * | 12/2020 | Yan | H02K 33/16 |
| 2020/0412226 | A1 * | 12/2020 | Ma | H02K 33/16 |
| 2020/0412228 | A1 * | 12/2020 | Mao | H02K 33/18 |
| 2021/0075306 | A1 * | 3/2021 | Little | H02K 33/02 |
| 2022/0255412 | A1 * | 8/2022 | Wang | H02K 33/16 |

* cited by examiner

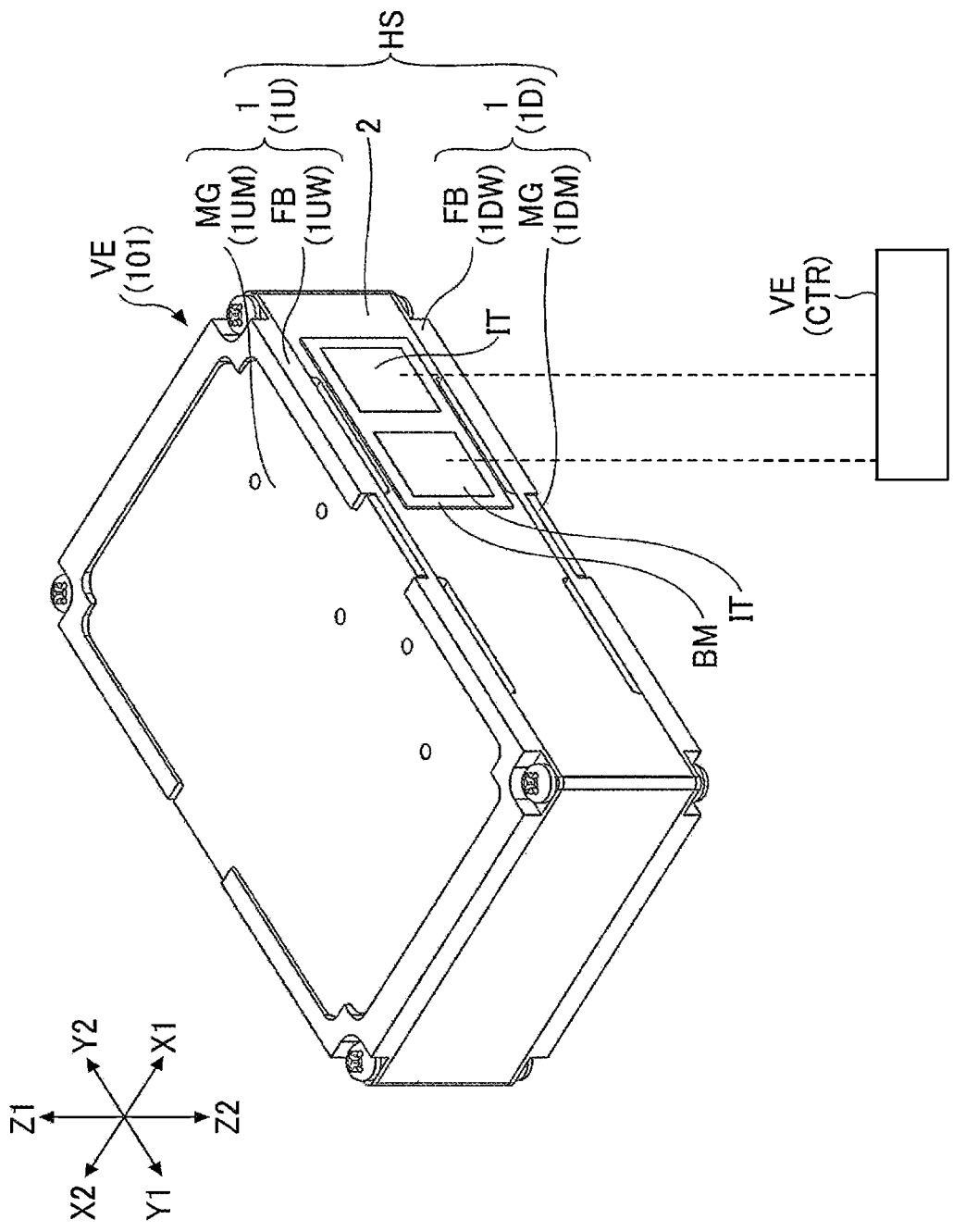

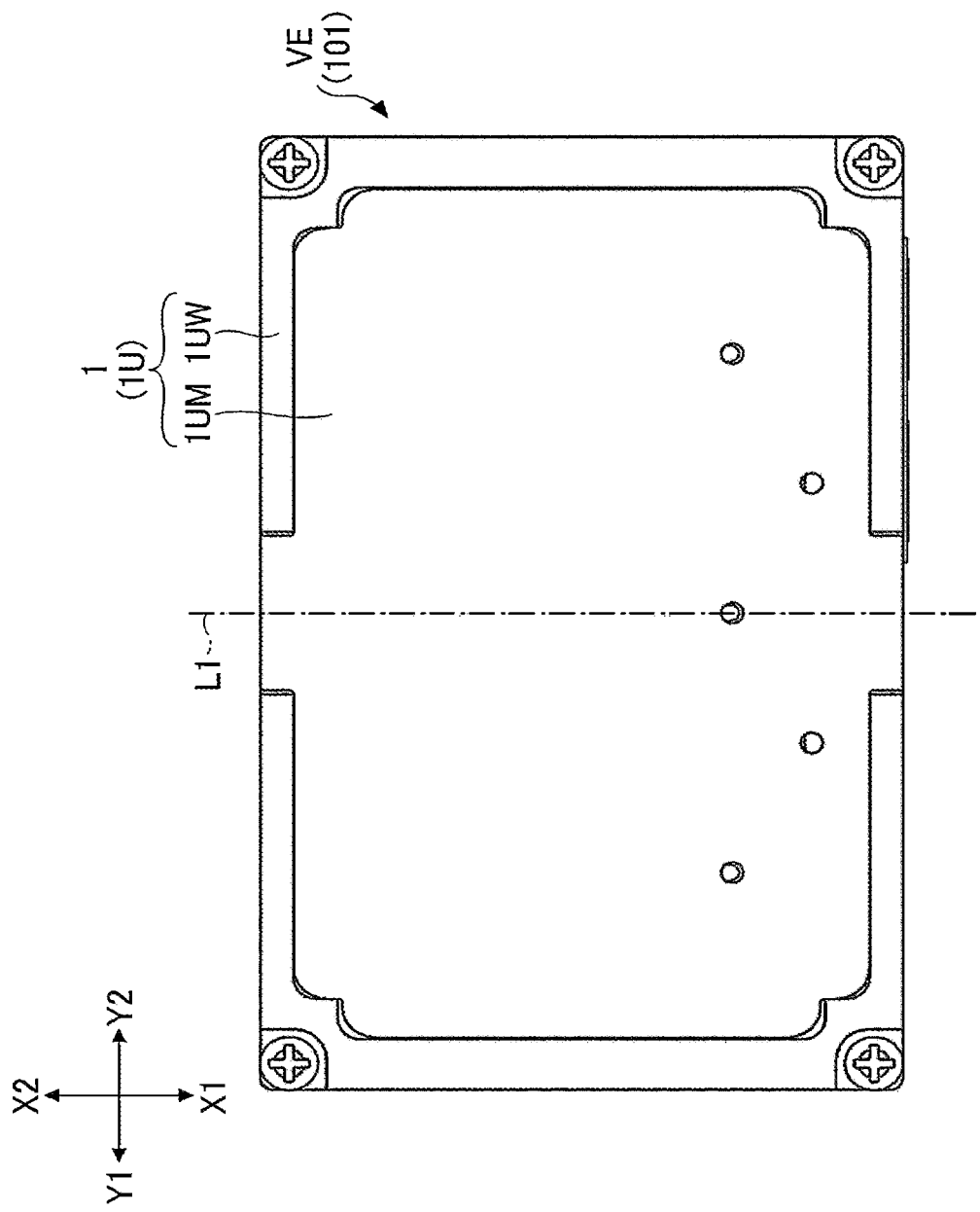

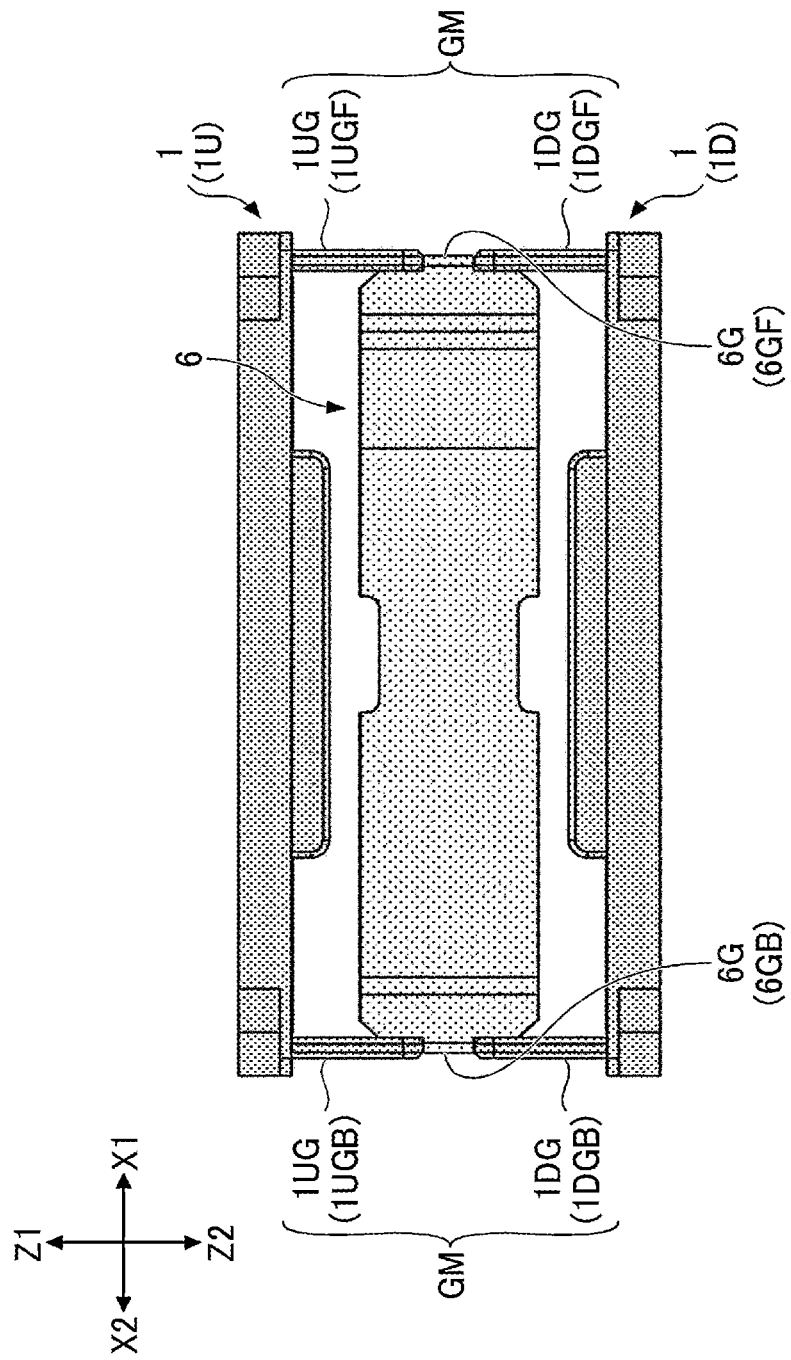

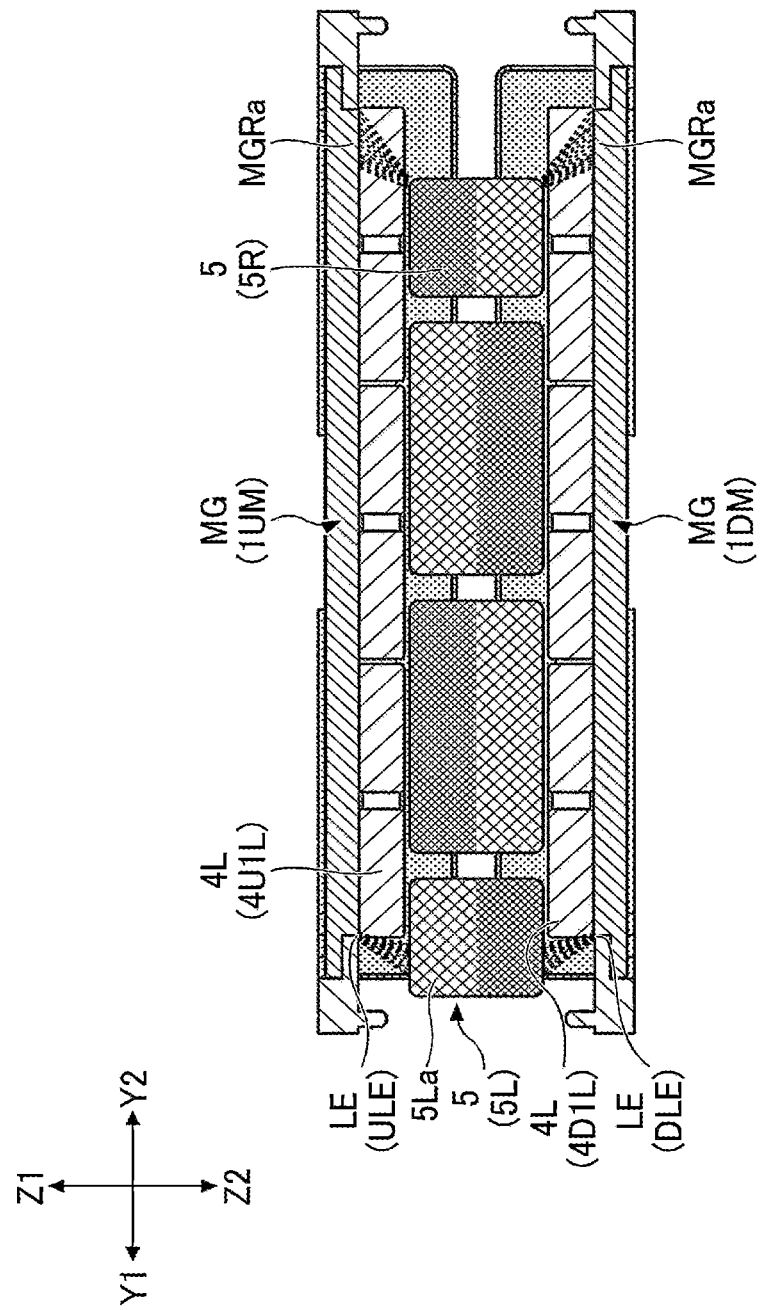

VIBRATION GENERATING DEVICE WITH MOVABLE BODY, GUIDE MEMBER, MAGNETIC MEMBER AROUND COIL

CROSS-REFERENCE TO RELATED APPLICATION

This application is a continuation application of International Application No. PCT/JP2021/043280 filed on Nov. 25, 2021, and designated the U.S., which is based upon and claims priority to Japanese Patent Application No. 2020-217439, filed on Dec. 25, 2020, the entire contents of which are incorporated herein by reference.

BACKGROUND

1. Field of the Invention

The present disclosure relates to a vibration generating device.

2. Description of the Related Art

A conventionally known vibration generating device supports a movable magnet such that the movable magnet can vibrate, using a spring member disposed between the movable magnet and a housing. The movable magnet serves as a movable body and the housing serves as the stationary body. In such a vibration generating device, the spring member is compressed when the movable magnet moves from an initial position by the action of an electromagnetic force, and the spring member generates a resilient force that works so as to return the movable magnet to the initial position.

However, a vibration power obtained by such a vibration generating device is insufficient at frequencies other than resonance frequencies. Moreover, the spring member has a lifetime due to metal fatigue.

Under such circumstances, a known linear vibration actuator is configured to return a movable magnet to an initial position without use of a spring member (see, for example, Patent Document 1). This linear vibration actuator includes a magnetic spring that utilizes a repulsive force between a movable magnet and another magnet attached to a housing. Similar to the spring member, the magnetic spring is configured to generate a resilient force that works so as to return the movable magnet to an initial position after the movable magnet has moved from the initial position by the action of an electromagnetic force.

CITATION LIST

Patent Document

Patent Document 1: International Publication No. 2019/151232

In the above-described configuration, the other magnet differing from the movable magnet is attached to the housing. This leads to an increase in the number of parts and in the size of the linear vibration actuator.

In view thereof, it is desirable to provide a vibration generating device that is configured to return a movable magnet, which has been moved by the action of an electromagnetic force, toward an initial position without use of the spring member or without attaching the other magnet to the stationary body for the magnetic spring, as disclosed in Patent Document 1.

SUMMARY

A vibration generating device according to an embodiment of the present invention includes: a stationary body; a movable body housed in the stationary body; a guide member that is configured to guide the movable body so that the movable body is reciprocally movable in the stationary body along a left-and-right direction; a magnetic flux-generating member that is fixed to the movable body and configured to generate a magnetic flux along an up-and-down direction; a coil that is fixed to the stationary body so as to cross the magnetic flux and includes electrically conductive wires extending along a front-and-back direction and being juxtaposed along the left-and-right direction; and a magnetic member that is fixed to the stationary body and disposed at an outer side of the coil. The magnetic member is disposed so as to generate an attractive force to attract the movable body located at a position off a center of a movable range of the movable body, to the center of the movable range of the movable body.

BRIEF DESCRIPTION OF DRAWINGS

FIG. 1A is a perspective view of a vibration generating device.

FIG. 1B is a top plan view of the vibration generating device.

FIG. 5B is a detailed view of the members that form the guide member.

FIG. 9C is a cross-sectional view of the casing, the coil, and the magnetic flux source.

DESCRIPTION OF THE EMBODIMENTS

Figure 2:
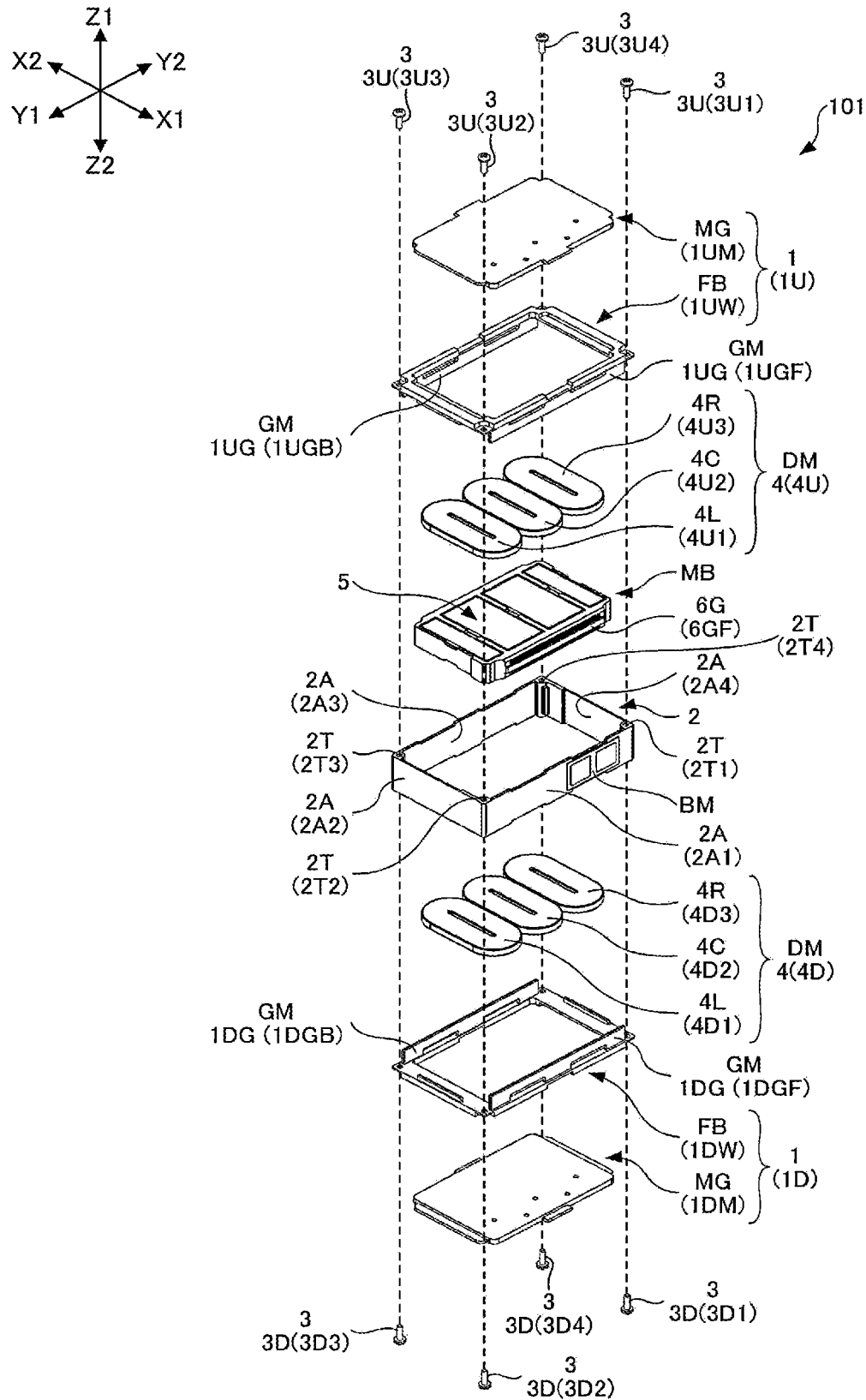
FIG. 2 is an exploded perspective view of the vibration generating device.

Hereinafter, referring to the drawings, a vibration generating device 101 according to an embodiment of the present disclosure will be described. FIG. 1A and FIG. 1B are outline views of the vibration generating device 101. Specifically, FIG. 1A is a perspective view of the vibration generating device 101, and FIG. 1B is a top plan view of the vibration generating device 101. FIG. 2 is an exploded perspective view of the vibration generating device 101.

In each of FIG. 1A, FIG. 1B, and FIG. 2, X1 represents one direction of an X axis that forms a three-dimensional orthogonal coordinate system, and X2 represents the other direction of the X axis. Also, Y1 represents one direction of a Y axis that forms the three-dimensional orthogonal coordinate system, and Y2 represents the other direction of the Y axis. Similarly, Z1 represents one direction of a Z axis that forms the three-dimensional orthogonal coordinate system, and Z2 represents the other direction of the Z axis. In the present embodiment, the X1 side of the vibration generating device 101 corresponds to a front side (front-face side) of the vibration generating device 101, and the X2 side of the vibration generating device 101 corresponds to a back side (back-face side) of the vibration generating device 101. Also, the Y1 side of the vibration generating device 101 corresponds to a left-hand side of the vibration generating device 101, and the Y2 side of the vibration generating device 101 corresponds to a right-hand side of the vibration generating device 101. The Z1 side of the vibration generating device 101 corresponds to a top side of the vibration generating device 101, and the Z2 side of the vibration generating device 101 corresponds to a bottom side of the vibration generating device 101. The same applies to the other drawings.

A vibration device VE includes a controller CTR and the vibration generating device 101. The vibration generating device 101 includes a housing HS as the stationary body, a movable body MB housed in the housing HS, and a coil 4 attached to the housing HS. The controller CTR is connected to input terminals IT provided on an insulating substrate BM fixed to the housing HS. Note that, the dashed lines in FIG. 1A schematically illustrate that the controller CTR is electrically connected to the input terminals IT provided on the insulating substrate BM.

As illustrated in FIG. 1A, the housing HS has a generally cuboid outline and is configured such that the areas of the planes parallel to the XY plane (the top face and the bottom face) are the largest. In the present embodiment, the housing HS is formed of a casing 1 and a side casing 2.

As illustrated in FIG. 2, the casing 1 includes an upper casing 1U forming a top face of the housing HS, and a lower casing 1D forming a bottom face of the housing HS. The upper casing 1U and the lower casing 1D are both plate members. In the present embodiment, the upper casing 1U and the lower casing 1D have the same shape and the shape size. In other words, the upper casing 1U and the lower casing 1D are the same parts.

Also, the upper casing 1U is formed so as to be front-back symmetrical and left-right symmetrical. The lower casing 1D is formed in the same way. The upper casing 1U and the lower casing 1D are disposed so as to be top-bottom symmetrical to each other.

Specifically, the upper casing 1U includes an upper magnetic member 1UM and an upper frame 1UW. Similarly, the lower casing 1D includes a lower magnetic member 1DM and a lower frame 1DW. Note that, hereinafter, the upper magnetic member 1UM and the lower magnetic member 1DM will also be referred to as a magnetic member MG, and the upper frame 1UW and the lower frame 1DW will also be referred to as a frame FB.

The magnetic member MG is disposed at a position away from a magnetic flux source 5 so that the magnetic member MG and the magnetic flux source 5 are magnetically attracted to each other. In the present embodiment, the magnetic member MG is fixed to the frame FB so as not to contact the magnetic flux source 5 forming the movable body MB and so as to be able to magnetically retain the magnetic flux source 5 at a predetermined position. When the magnetic flux source 5 is displaced from the predetermined position, the magnetic member MG works so as to return the magnetic flux source 5 to the predetermined position by the action of an attractive force between the magnetic flux source 5 and the magnetic member MG, the attractive force being based on a magnetic force generated by the magnetic flux source 5. The predetermined position is, for example, a position of the magnetic flux source 5 when the movable body MB is located at the center of the movable range.

The frame FB is a non-magnetic member configured to support the magnetic member MG. In the present embodiment, the frame FB is formed of austenitic stainless steel. The frame FB may be formed of a synthetic resin. The magnetic member MG is joined with the frame FB with an adhesive.

The side casing 2 is made to form the side surface of the housing HS. In the present embodiment, the side casing 2 is a non-magnetic member and formed of austenitic stainless steel. The side casing 2 may be formed of a synthetic resin. Specifically, the side casing 2 includes four side plates 2A each formed into a flat plate. More specifically, as illustrated in FIG. 2, the side plates 2A have a first side plate 2A1 and a third side plate 2A3 that face each other, and a second side plate 2A2 and a fourth side plate 2A4 that face each other and are perpendicular to the first side plate 2A1 and the third side plate 2A3, respectively.

The casing 1 is fastened to the side casing 2 with fastening members 3. Specifically, the fastening members 3 have upper fastening members 3U and lower fastening members 3D. In the present embodiment, the fastening members 3 are external screws that can be treated with a Phillips screwdriver, and are configured to engage with internal thread holes 2T formed at the corners of the side casing 2. The internal thread holes 2T, formed at the corners of the side casing 2, are formed so as to penetrate the corners of the side casing 2 along the Z-axis direction. The internal thread holes 2T have a first internal thread hole 2T1 to a fourth internal thread hole 2T4. The upper casing 1U (upper frame 1UW) is fastened to the side casing 2 with four upper fastening members 3U (first upper external screw 3U1 to fourth upper external screw 3U4). Specifically, the first upper external screw 3U1 is screwed into an upper opening of the first internal thread hole 2T1 formed at the right-front corner of the side casing 2, the second upper external screw 3U2 is screwed into an upper opening of the second internal thread hole 2T2 formed at the left-front corner of the side casing 2, the third upper external screw 3U3 is screwed into an upper opening of the third internal thread hole 2T3 formed at the left-back corner of the side casing 2, and the fourth upper external screw 3U4 is screwed into an upper opening of the fourth internal thread hole 2T4 formed at the right-back corner of the side casing 2. Similarly, the lower casing 1D (lower frame 1DW) is fastened to the side casing 2 with four lower fastening members 3D (first lower external screw 3D1 to fourth lower external screw 3D4). Specifically, the first lower external screw 3D1 is screwed into a lower opening of the first internal thread hole 2T1 formed at the right-front corner of the side casing 2, the second lower external screw 3D2 is screwed into a lower opening of the second internal thread hole 2T2 formed at the left-front corner of the side casing 2, the third lower external screw 3D3 is screwed into a lower opening of the third internal thread hole 2T3 formed at the left-back corner of the side casing 2, and the fourth lower external screw 3D4 is screwed into a lower opening of the fourth internal thread hole 2T4 formed at the right-back corner of the side casing 2.

The coil 4 is a member forming a drive member DM. In the present embodiment, the coil 4 is a wire-wound coil that is formed through winding of an electrically conductive wire coated with an insulating material on the surface thereof, and is fixed to the casing 1. For simplicity, FIG. 2 does not illustrate a detailed wound state of the electrically conductive wire. The same applies to some other drawings that illustrate the coil 4. The coil 4 may be, for example, a layer-stacked coil or a thin-film coil. Specifically, the coil 4 includes an upper coil 4U that is fixed to a lower (Z2-side) face of the upper casing 1U (upper magnetic member 1UM), and a lower coil 4D that is fixed to an upper (Z1-side) face of the lower casing 1D (lower magnetic member 1DM). The upper coil 4U includes a first upper coil 4U1, a second upper coil 4U2, and a third upper coil 4U3 that are juxtaposed along the Y-axis direction and connected together in series. The lower coil 4D includes a first lower coil 4D1, a second lower coil 4D2, and a third lower coil 4D3 that are juxtaposed along the Y-axis direction and connected together in series. Note that, hereinafter, the first upper coil 4U1 and the first lower coil 4D1 will also be referred to as a left-hand coil 4L, the second upper coil 4U2 and the second lower coil 4D2 will also be referred to as a middle coil 4C, and the third upper coil 4U3 and the third lower coil 4D3 will also be referred to as a right-hand coil 4R.

The controller CTR can control movement of the movable body MB. In the present embodiment, the controller CTR is a device including an electronic circuit, nonvolatile memory, and so on and can control the direction and intensity of a current flowing through the coil 4. The controller CTR may be configured to control the direction and intensity of the current flowing through the coil 4 in accordance with a control command from an external device such as a computer. Alternatively, the controller CTR may be configured to control the direction and intensity of the current flowing through the coil 4 without receiving any control command from an external device. Note that, in the present embodiment, the controller CTR is placed outside of the housing HS, but may be placed inside of the housing HS.

The movable body MB can vibrate the housing HS. In the present embodiment, the movable body MB reciprocally moves in a state of being attached in the housing HS, and thereby can vibrate the housing HS.

Figure 3A:
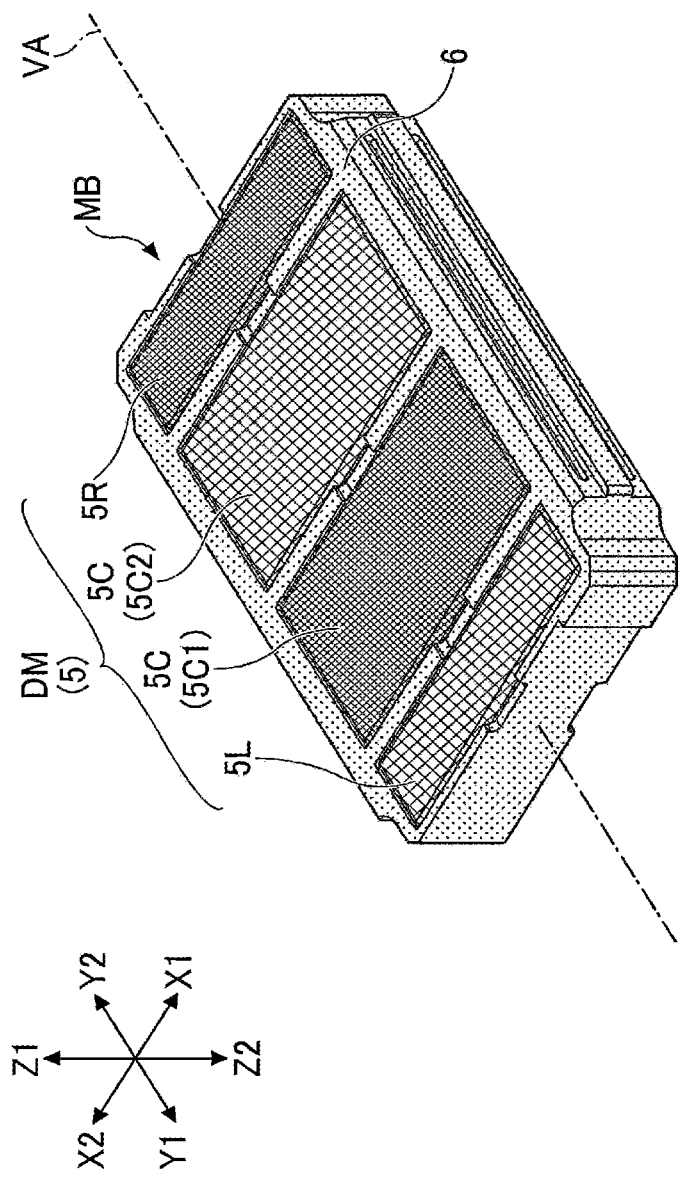
FIG. 3A is a perspective view of the whole movable body.
Figure 3B:
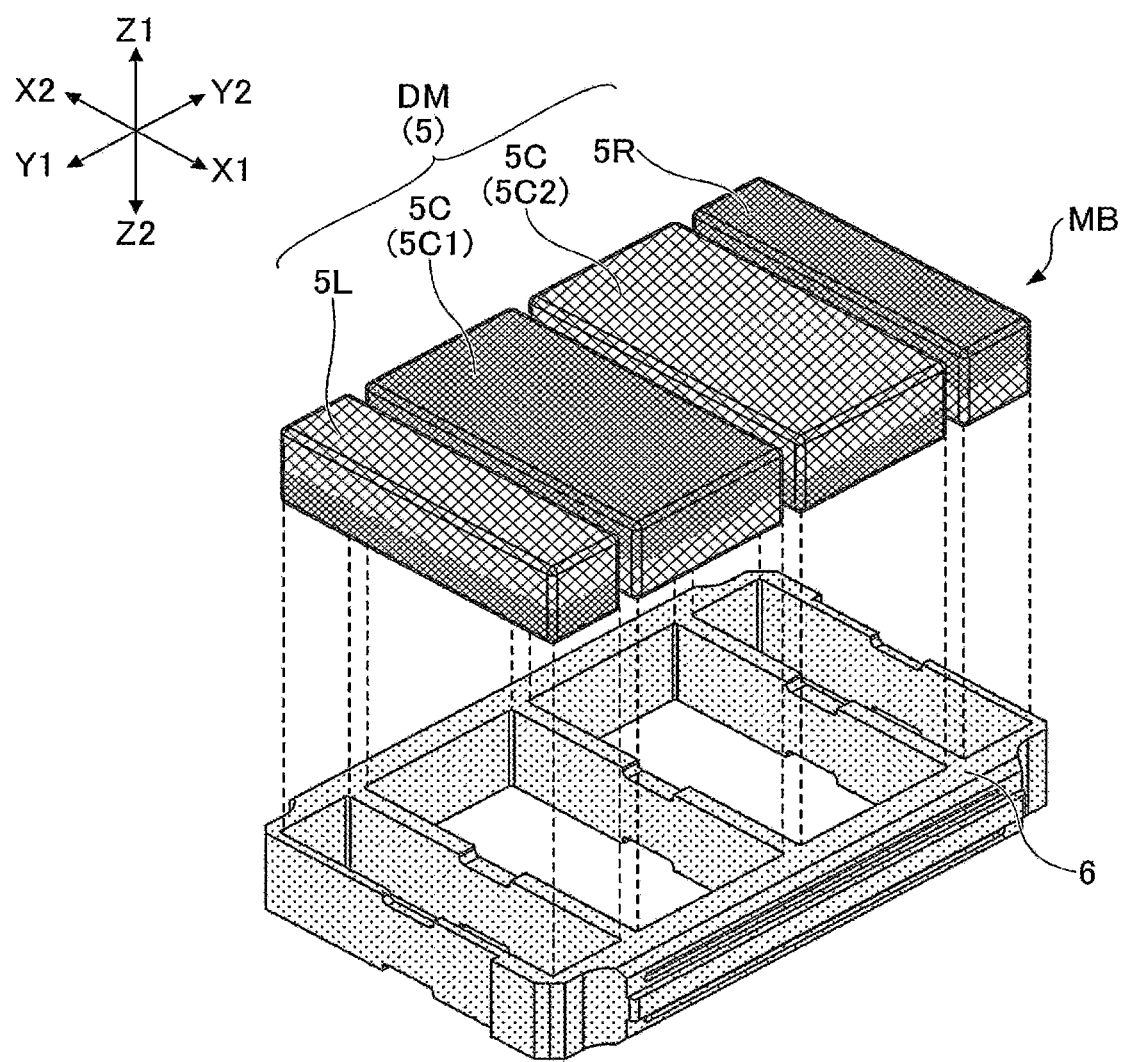
FIG. 3B is an exploded perspective view of the movable body.
Figure 4:
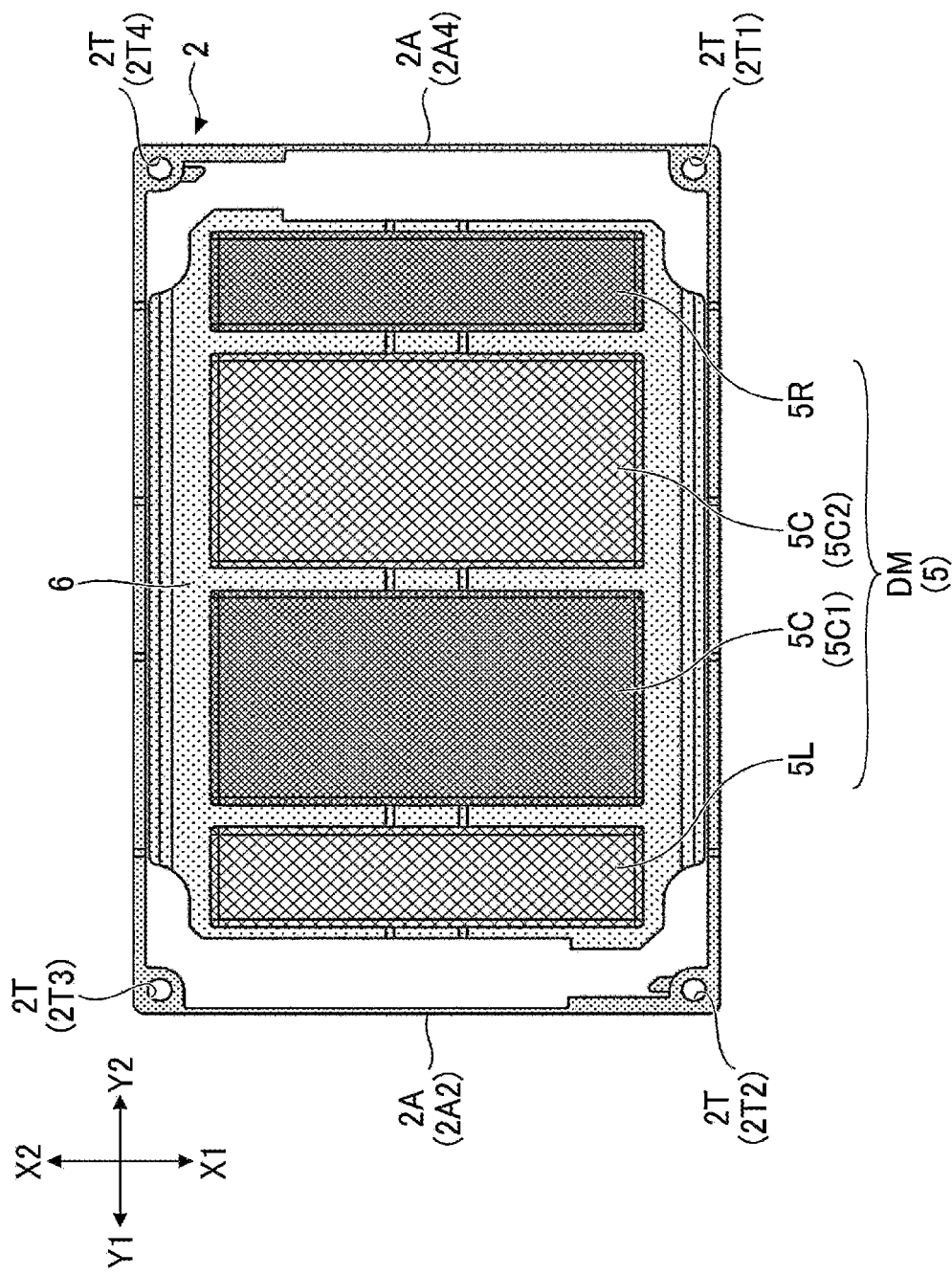
FIG. 4 is an outline view of the movable body.

Next, referring to FIG. 3A, FIG. 3B, and FIG. 4, the movable body MB will be described in detail. FIG. 3A, FIG. 3B, and FIG. 4 are outline views of the movable body MB. Specifically, FIG. 3A is a perspective view of the whole movable body MB, and FIG. 3B is an exploded perspective view of the movable body MB. FIG. 4 is a top plan view of the movable body MB attached to the side casing 2.

The movable body MB includes the magnetic flux source 5 and a magnetic flux source-retaining member 6. Specifically, the movable body MB can reciprocally move (vibrate) relative to the housing HS (side casing 2) along a vibration axis VA (see FIG. 3A) extending in a predetermined direction.

The magnetic flux source 5 is a member forming the drive member DM and can generate a magnetic flux. In the present embodiment, the magnetic flux source 5 is a permanent magnet and includes a left-hand magnet 5L, a middle magnet 5C, and a right-hand magnet 5R. The middle magnet 5C includes a first middle magnet 5C1 and a second middle magnet 5C2. The left-hand magnet 5L, the first middle magnet 5C1, the second middle magnet 5C2, and the right-hand magnet 5R are each a bipolar-magnetized permanent magnet and are juxtaposed along the Y-axis direction.

The magnetic flux source-retaining member 6 can retain the magnetic flux source 5. In the present embodiment, the magnetic flux source-retaining member 6 is a rectangular frame member formed of a synthetic resin, and can retain the left-hand magnet 5L, the first middle magnet 5C1, the second middle magnet 5C2, and the right-hand magnet 5R along the Y-axis direction at approximately equal intervals.

The drive member DM is one exemplary vibration force generator, and can vibrate the movable body MB along the vibration axis VA. In the present embodiment, the drive member DM is composed of the coil 4 and the magnetic flux source 5, and can vibrate the movable body MB (magnetic flux source 5) along the vibration axis VA by utilizing an electromagnetic force generated between the coil 4 and the magnetic flux source 5 in accordance with the direction and intensity of a current supplied to the coil 4 via the controller CTR.

Figure 5A:
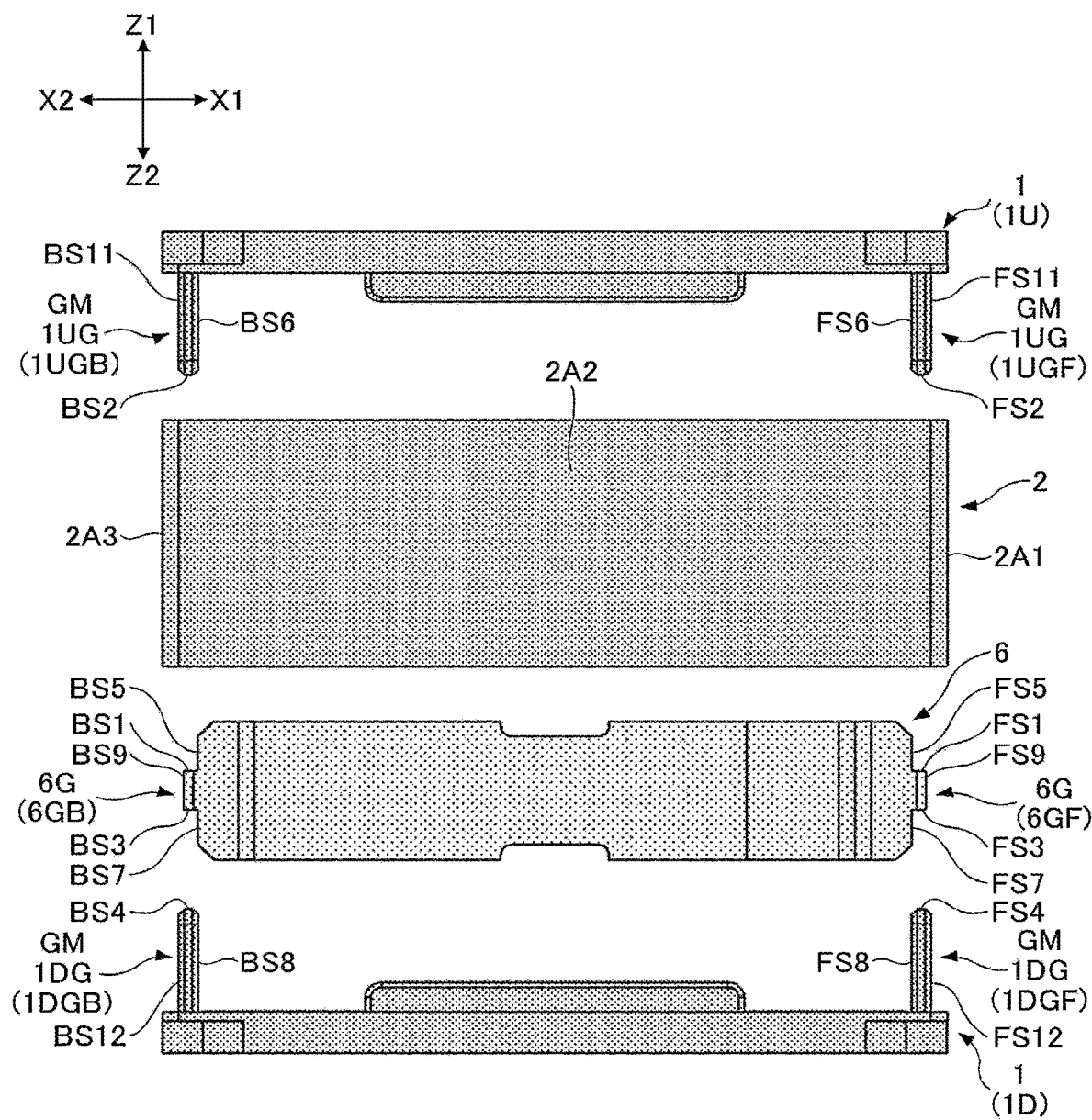
FIG. 5A is a detailed view of members that form a guide member.
Figure 6A:
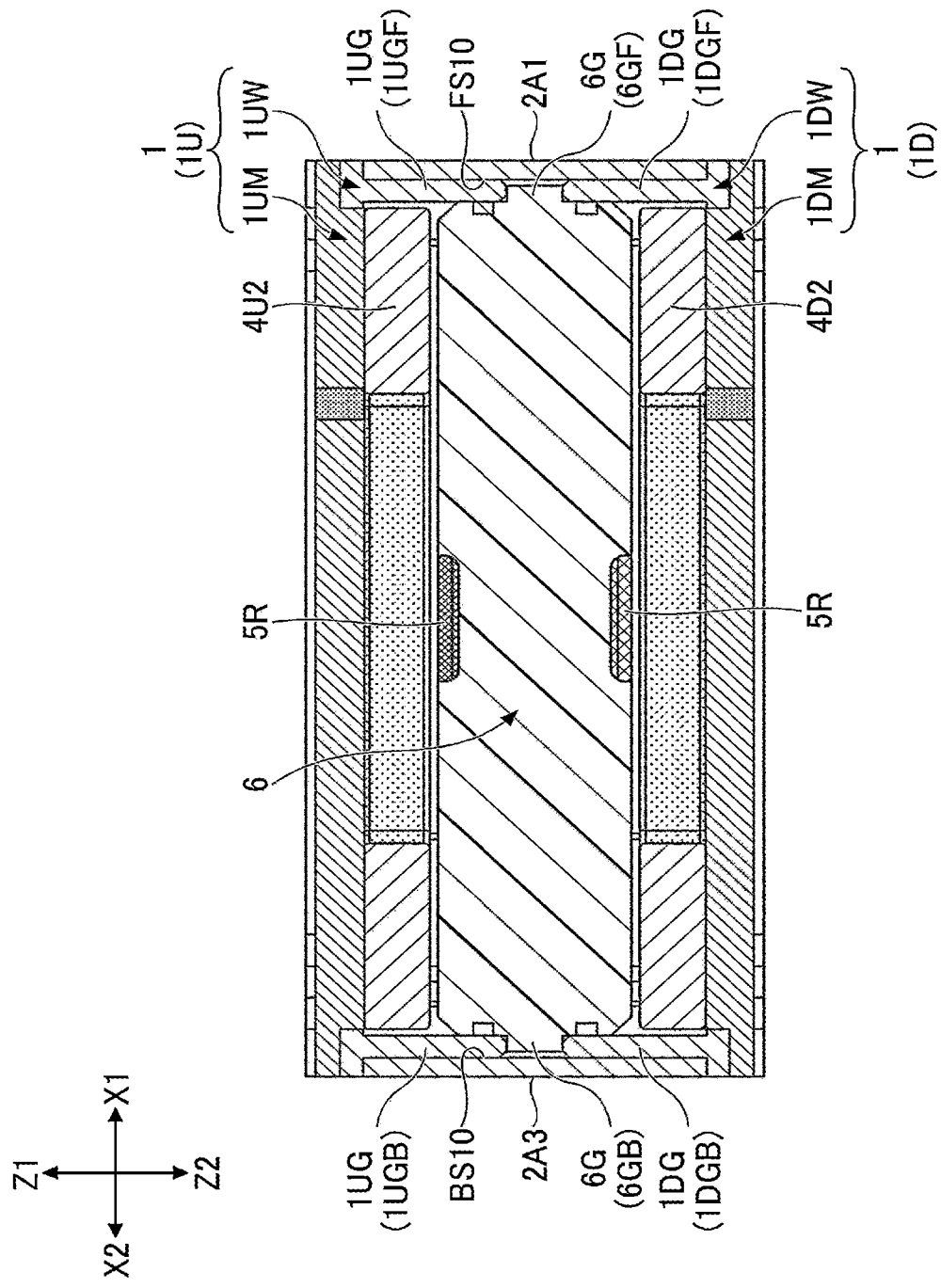
FIG. 6A is a cross-sectional view of the vibration generating device.
Figure 6B:
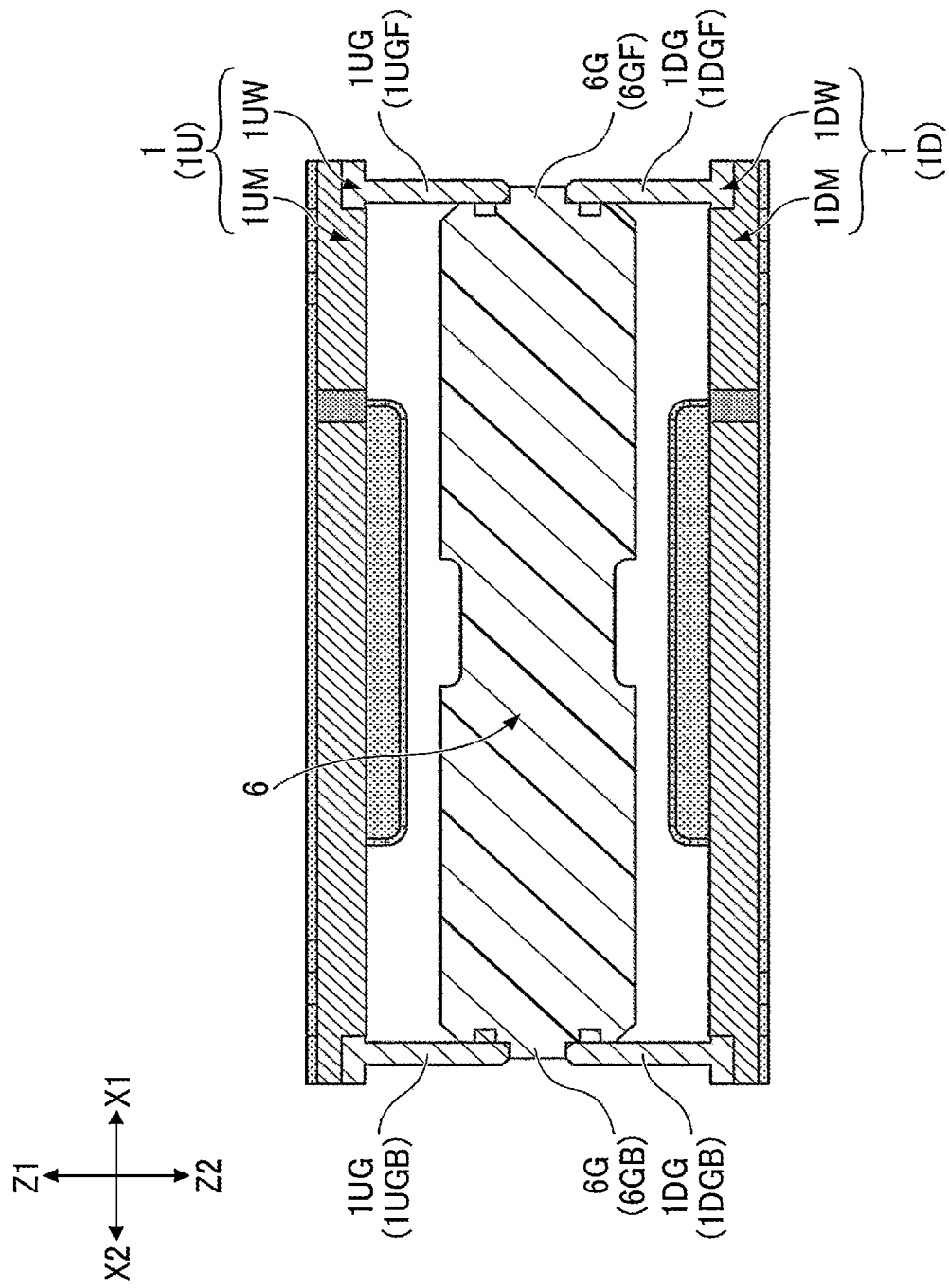
FIG. 6B is a cross-sectional view of the vibration generating device.
Figure 7A:
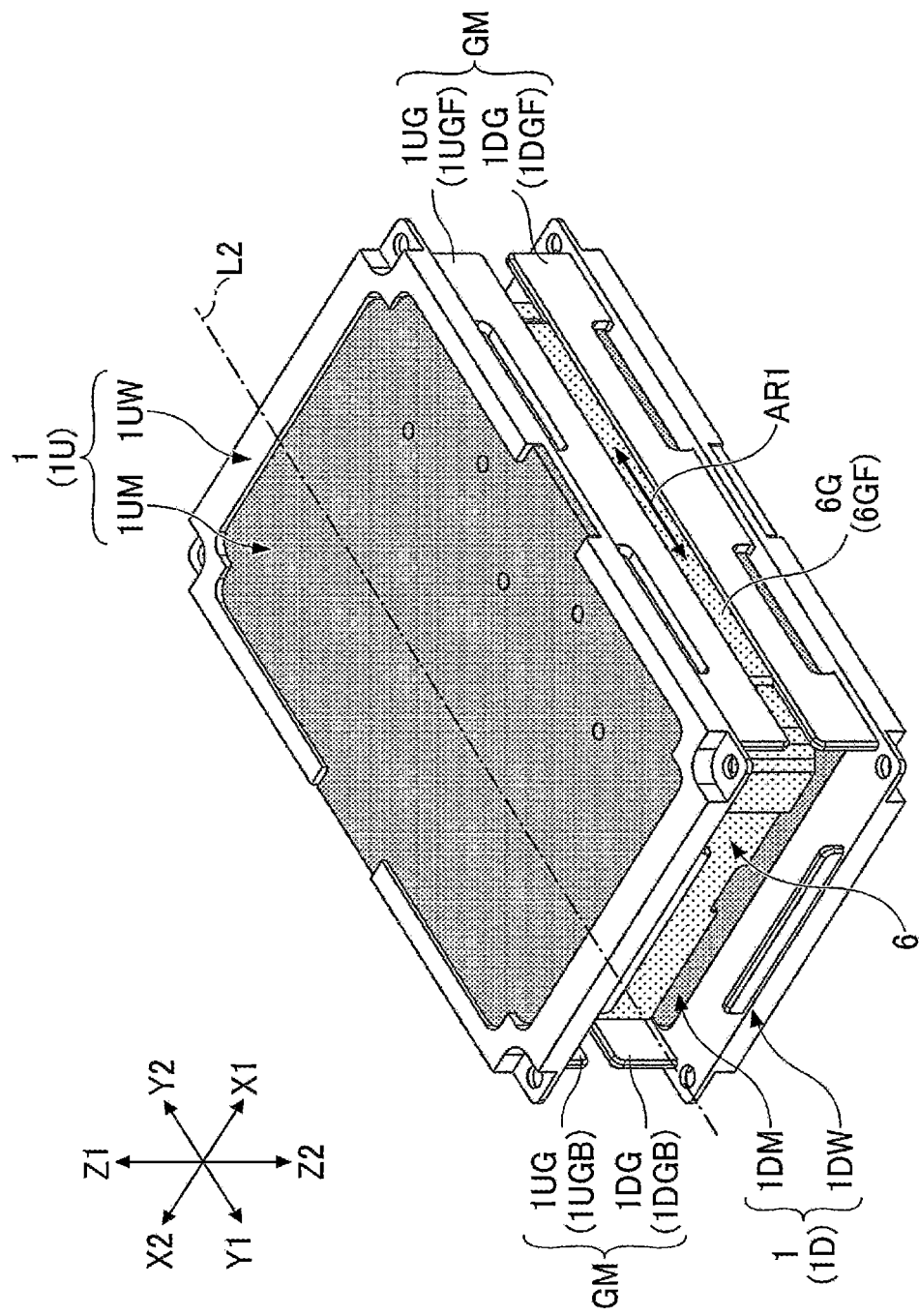
FIG. 7A is a perspective view of the members that form the guide member.
Figure 7B:
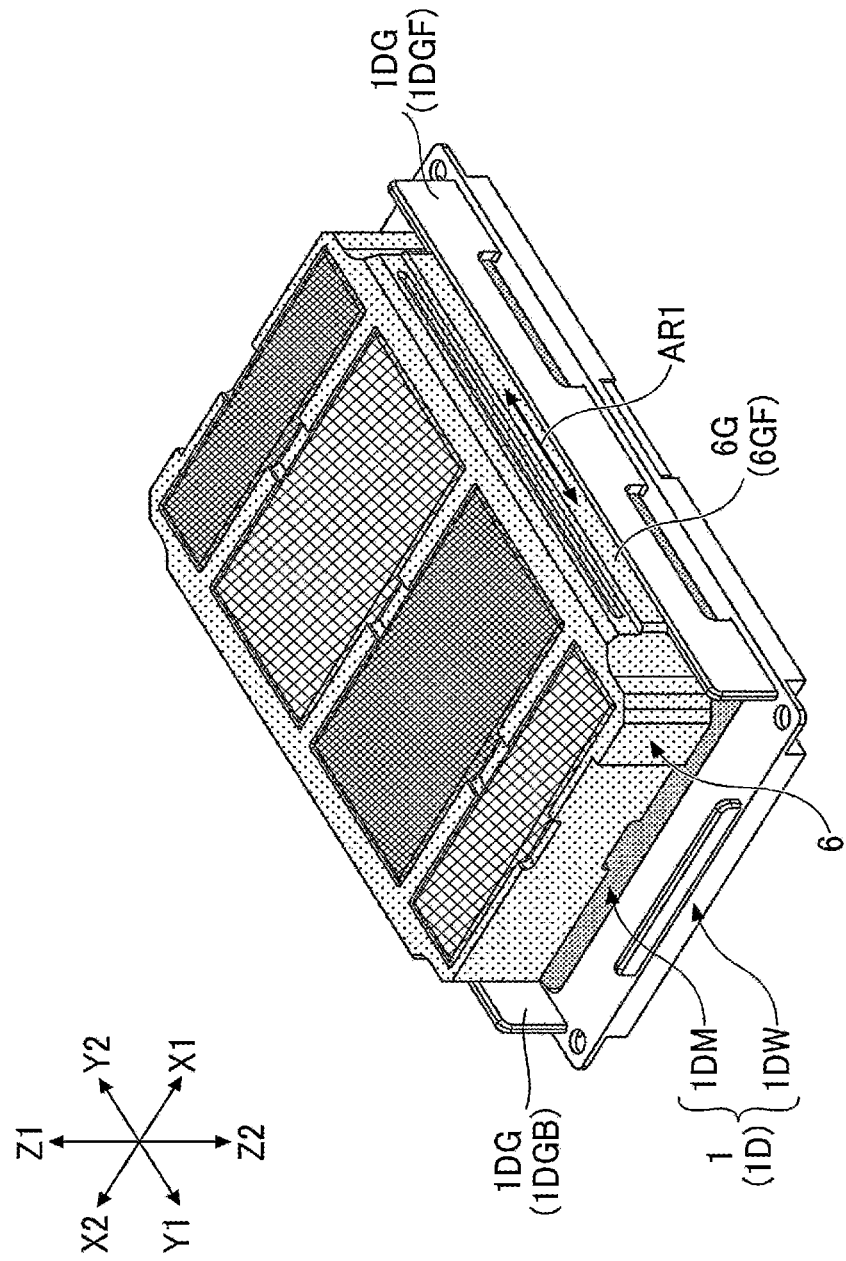
FIG. 7B is a perspective view of the members that form the guide member.

Next, referring to FIG. 5A, FIG. 5B, FIG. 6A, FIG. 6B, FIG. 7A, and FIG. 7B, a guide member GM will be described. FIG. 5A and FIG. 5B are detailed views of members that form the guide member GM. Specifically, FIG. 5A is a left side view of the upper casing 1U, the lower casing 1D, the side casing 2, and the magnetic flux source-retaining member 6 that are in an exploded state. FIG. 5B is a left side view of the upper casing 1U, the lower casing 1D, and the magnetic flux source-retaining member 6 that are in a combined state. In FIG. 5A and FIG. 5B, for ease of understanding, the casing 1 and the side casing 2 are given fine dot patterns, and the magnetic flux source-retaining member 6 is given a coarse dot pattern. Also, for simplicity, FIG. 5B does not illustrate the side casing 2 that is illustrated in FIG. 5A. FIG. 6A and FIG. 6B are cross-sectional views of the vibration generating device 101. Specifically, FIG. 6A illustrates a cross section, as viewed from the Y1 side, of the vibration generating device 101 in a plane parallel to the XZ plane including a chain dotted line L1 illustrated in FIG. 1B. FIG. 6B is the same drawing as FIG. 6A except that the coil 4 and the magnetic flux source 5 are not illustrated. FIG. 7A and FIG. 7B are perspective views of members that form the guide member GM. Specifically, FIG. 7A is a perspective view of the upper casing 1U, the lower casing 1D, and the magnetic flux source-retaining member 6 that are in a combined state. FIG. 7B is a perspective view of the lower casing 1D and the magnetic flux source-retaining member 6 that are in a combined state. In FIG. 7A and FIG. 7B, for ease of understanding, the magnetic flux source-retaining member 6 is given a coarse dot pattern. Also, FIG. 7B illustrates a state where the magnetic flux source 5 is retained by the magnetic flux source-retaining member 6.

The guide member GM can guide the movable body MB so that the movable body MB is reciprocally movable in the housing HS as the stationary body along the left-and-right direction (Y-axis direction). In the present embodiment, the guide member GM includes: an upper guide 1UG that is integrally formed with the upper casing 1U and extends downward (Z2 direction) from the upper casing 1U; and a lower guide 1DG that is integrally formed with the lower casing 1D and extends upward (Z1 direction) from the lower casing 1D. The guide member GM guides the movable body MB such that a part to be guided (hereinafter referred to as a "guided part") 6G, a projection formed in the magnetic flux source-retaining member 6 forming the movable body MB, is guided so that the guided part 6G is slidable along the left-and-right direction by the upper guide 1UG and the lower guide 1DG.

Specifically, the upper guide 1UG includes: an upper front guide 1UGF that faces the first side plate 2A1 of the side casing 2 (see FIG. 2) and extends in the Y-axis direction; and an upper back guide 1UGB that faces the third side plate 2A3 of the side casing 2 (see FIG. 2) and extends in the Y-axis direction. Similarly, the lower guide 1DG includes: a lower front guide 1DGF that faces the first side plate 2A1 of the side casing 2 (see FIG. 2) and extends in the Y-axis direction; and a lower back guide 1DGB that faces the third side plate 2A3 of the side casing 2 (see FIG. 2) and extends in the Y-axis direction.

The guided part 6G formed in the magnetic flux source-retaining member 6 includes: a front guided part 6GF that faces the first side plate 2A1 of the side casing 2 (see FIG. 2) and extends in the Y-axis direction; and a back guided part 6GB that faces the third side plate 2A3 of the side casing 2 (see FIG. 2) and extends in the Y-axis direction.

As illustrated in FIG. 5B, the tip end of the upper front guide 1UGF and the tip end of the lower front guide 1DGF are combined so as to sandwich the front guided part 6GF and face each other. Also, as illustrated in FIG. 5B, the tip end of the upper back guide 1UGB and the tip end of the lower back guide 1DGB are combined so as to sandwich the back guided part 6GB and face each other.

In the present embodiment, the tip end of the upper front guide 1UGF and the tip end of the lower front guide 1DGF are combined so as to contact the front guided part 6GF. In other words, the front guided part 6GF is formed to have approximately the same shape as a space formed between the tip end of the upper front guide 1UGF and the tip end of the lower front guide 1DGF. Specifically, the front guided part 6GF is formed as a projection of one generally cuboid shape that continuously extends over most of the total length in the longitudinal direction of the magnetic flux source-retaining member 6. However, the front guided part 6GF may be a combination of a plurality of projections that are discontinuously disposed along the longitudinal direction of the magnetic flux source-retaining member 6. The same applies to the back guided part 6GB. Also, in the present embodiment, the magnetic flux source-retaining member 6 is formed so as to be front-back symmetric. In other words, the front guided part 6GF and the back guided part 6GB are formed to have the same shape and the same size. Nonetheless, the shapes of the front guided part 6GF and the back guided part 6GB may be different from each other.

In the examples as illustrated in FIG. 5A and FIG. 5B, the magnetic flux source-retaining member 6 is configured such that a top face FS1 of the front guided part 6GF contacts a tip-end face FS2 of the upper front guide 1UGF and a bottom face FS3 of the front guided part 6GF contacts a tip-end face FS4 of the lower front guide 1DGF, in a state where the magnetic flux source-retaining member 6 is combined with the casing 1 and the side casing 2. Also, the magnetic flux source-retaining member 6 is configured such that an upper front face FS5 (a front face part at an upper position of the front guided part 6GF) contacts an inner face FS6 of the upper front guide 1UGF and a lower front face FS7 (a front face part at a lower position of the front guided part 6GF) contacts an inner face FS8 of the lower front guide 1DGF. Meanwhile, the magnetic flux source-retaining member 6 is configured such that a front face FS9 of the front guided part 6GF does not contact an inner face FS10 (see FIG. 6A) of the first side plate 2A1 of the side casing 2. Note that, the casing 1 is configured such that an outer face FS11 of the upper front guide 1UGF and the inner face FS10 of the first side plate 2A1 of the side casing 2 contact each other and an outer face FS12 of the lower front guide 1DGF and the inner face FS10 of the first side plate 2A1 of the side casing 2 contact each other.

Similarly, the magnetic flux source-retaining member 6 is configured such that a top face BS1 of the back guided part 6GB contacts a tip-end face BS2 of the upper back guide 1UGB and a bottom face BS3 of the back guided part 6GB contacts a tip-end face BS4 of the lower back guide 1DGB, in a state where the magnetic flux source-retaining member 6 is combined with the casing 1 and the side casing 2. Also, the magnetic flux source-retaining member 6 is configured such that an upper back face BS5 (a back face part at an upper position of the back guided part 6GB) contacts an inner face BS6 of the upper back guide 1UGB and a lower back face BS7 (a back face part at a lower position of the back guided part 6GB) contacts an inner face BS8 of the lower back guide 1DGB. Meanwhile, the magnetic flux source-retaining member 6 is configured such that a back face BS9 of the back guided part 6GB does not contact an inner face BS10 (see FIG. 6A) of the third side plate 2A3 of the side casing 2. Note that, the casing 1 is configured such that an outer face BS11 of the upper back guide 1UGB and the inner face BS10 of the third side plate 2A3 of the side casing 2 contact each other and an outer face BS12 of the lower back guide 1DGB and the inner face BS10 of the third side plate 2A3 of the side casing 2 contact each other.

As described above, the guided part 6G can slide between the upper guide 1UG and the lower guide 1DG in the directions indicated by a double-headed arrow AR1 in each of FIG. 7A and FIG. 7B. Specifically, the guided part 6G can reciprocally move in the left-and-right direction (Y-axis direction) with the top face thereof contacting the tip-end face of the upper guide 1UG and the bottom face thereof contacting the tip-end face of the lower guide 1DG.

With this configuration, the magnetic flux source-retaining member 6 is restricted from moving in the front-and-back direction and in the up-and-down direction, but is allowed to smoothly move in the left-and-right direction.

Figure 8A:
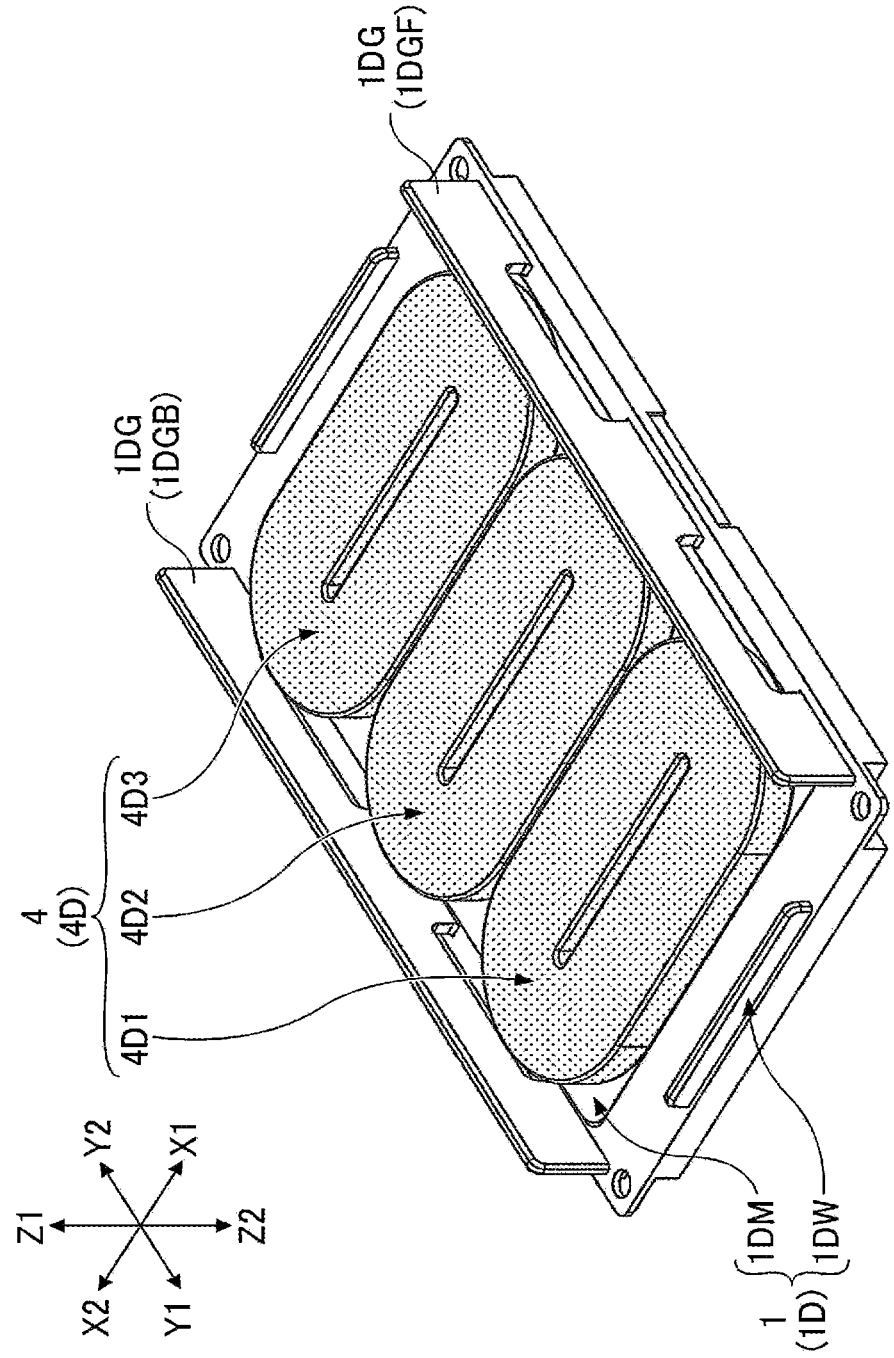
FIG. 8A is a perspective view of a coil that is fixed to a housing.
Figure 8B:
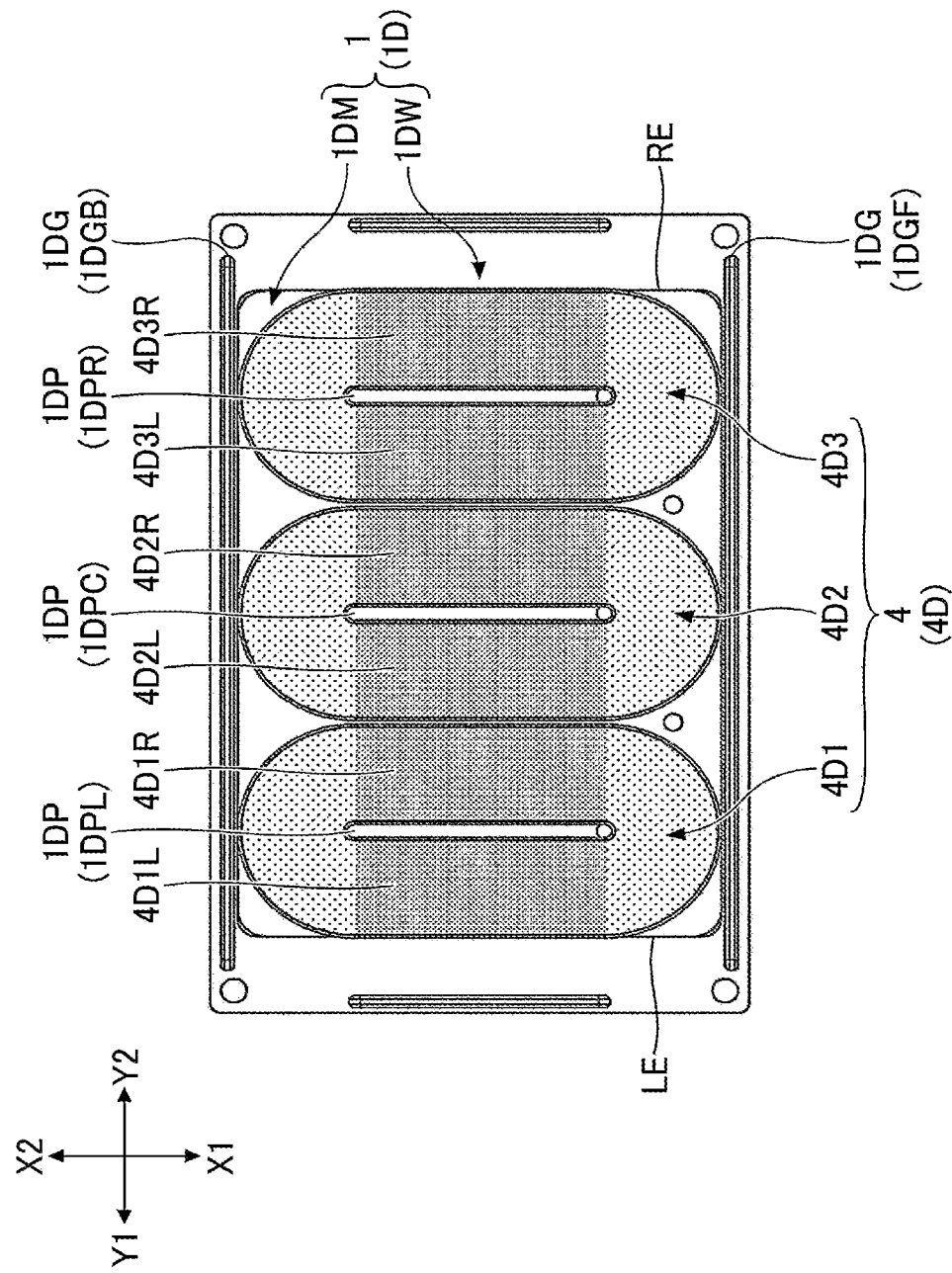
FIG. 8B is a top plan view of the coil that is fixed to the housing.
Figure 9A:
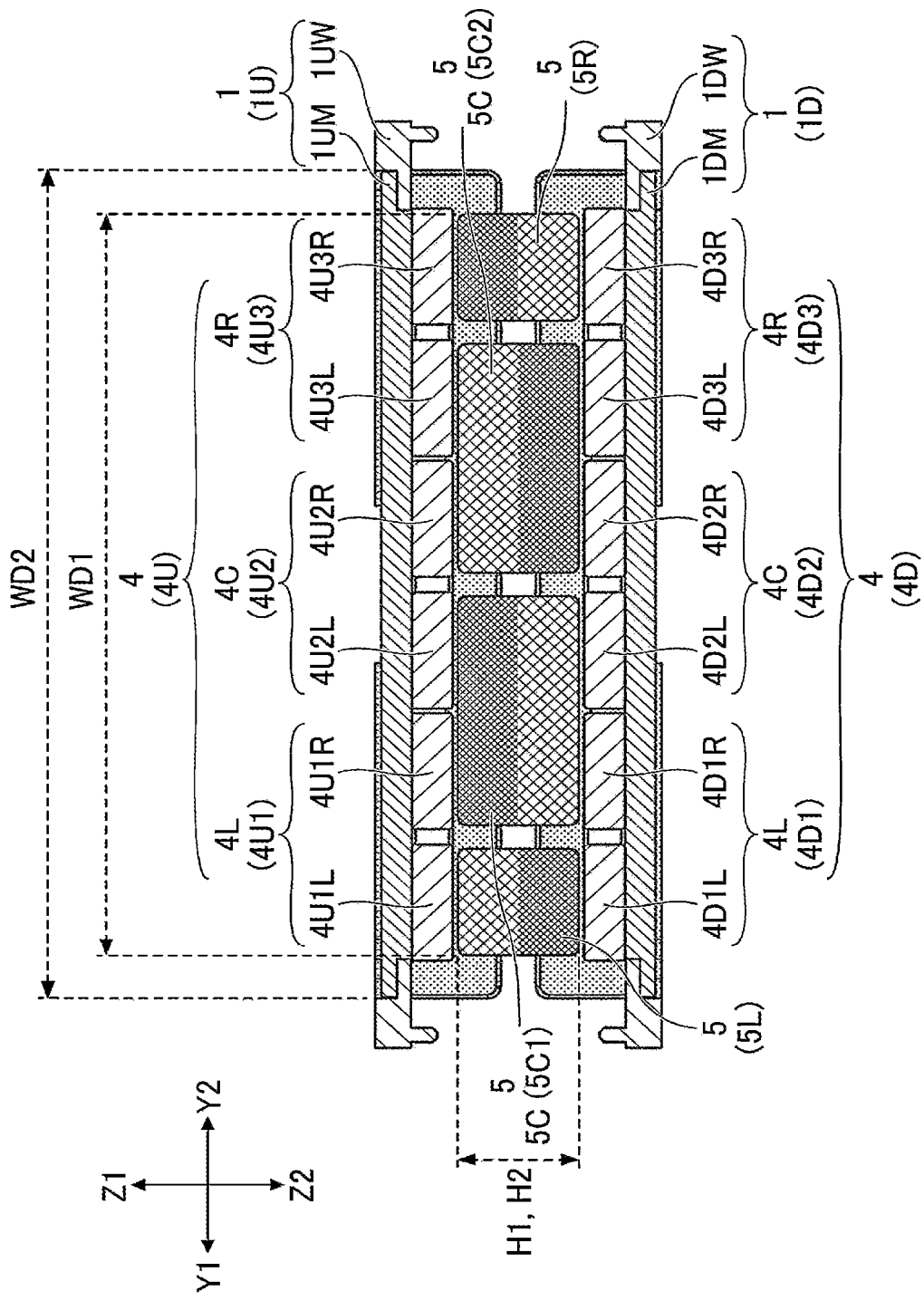
FIG. 9A is a cross-sectional view of a casing, the coil, and a magnetic flux source.
Figure 9B:
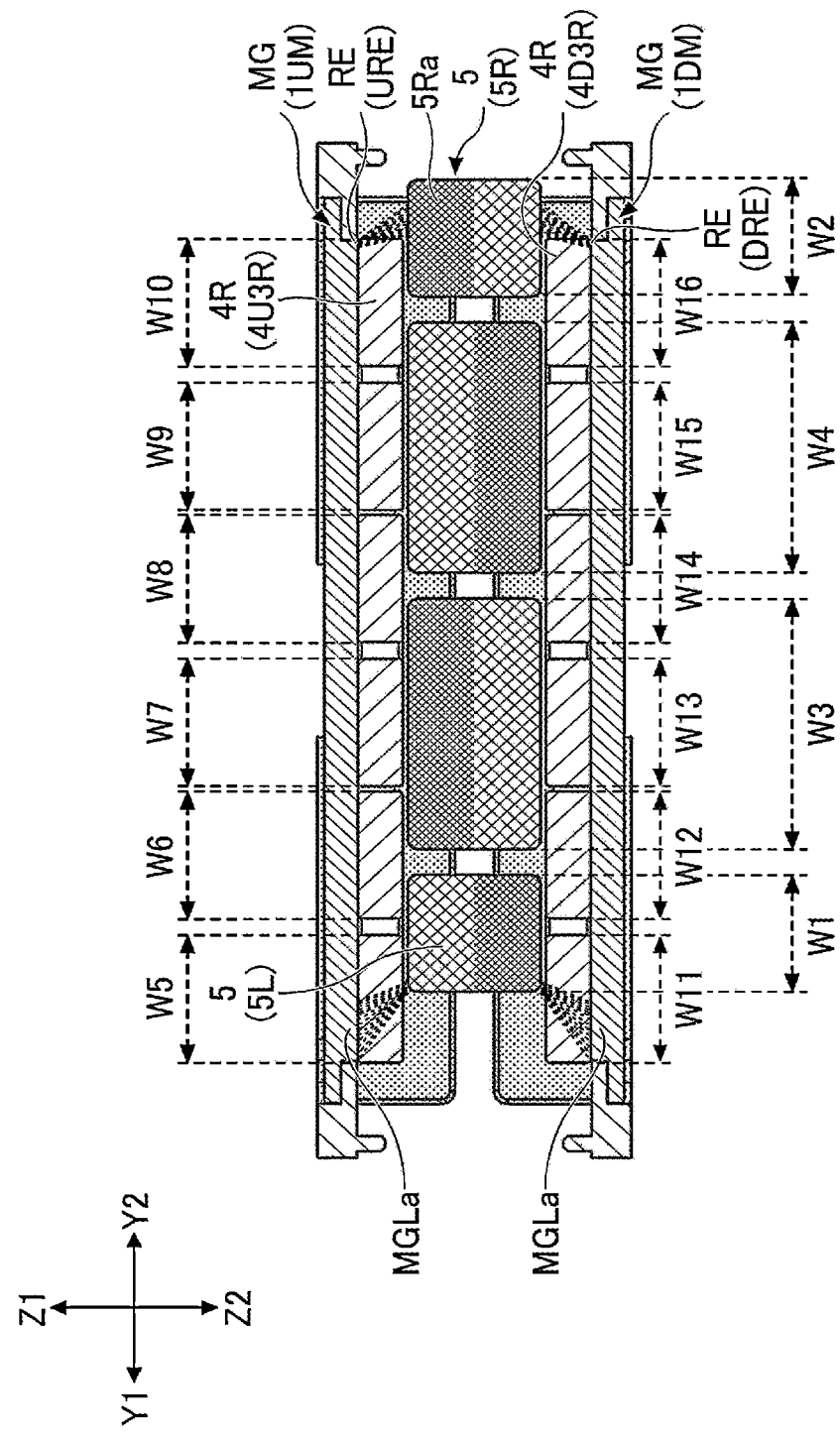
FIG. 9B is a cross-sectional view of the casing, the coil, and the magnetic flux source.
Figure 10A:
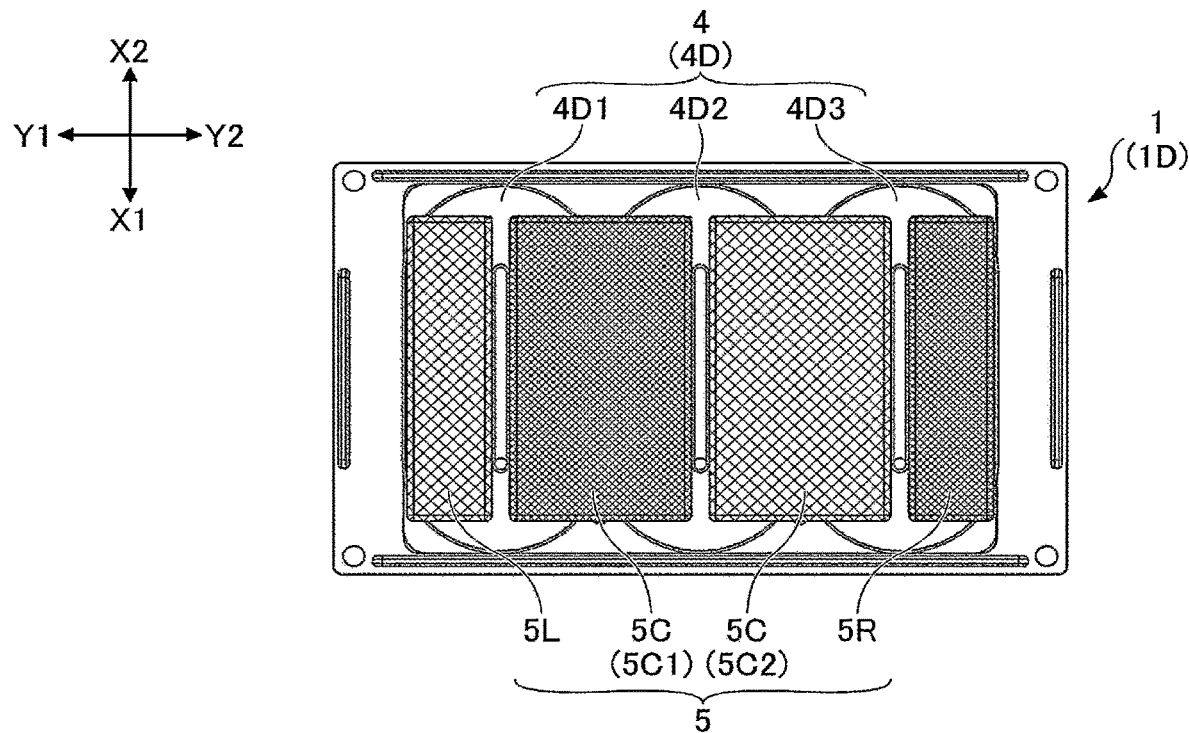
FIG. 10A is a top plan view of a lower casing, a lower coil, and the magnetic flux source.
Figure 10B:
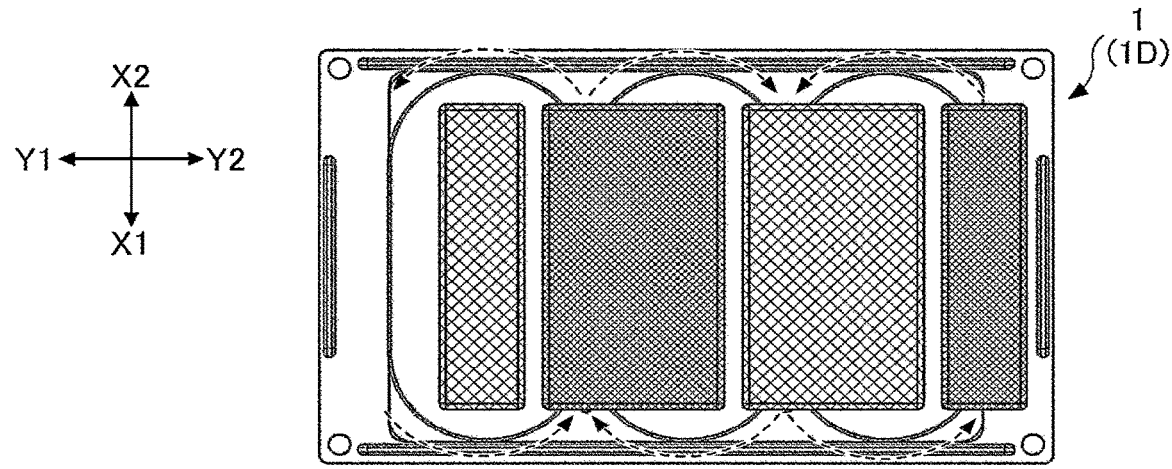
FIG. 10B is a top plan view of the lower casing, the lower coil, and the magnetic flux source.
Figure 10C:
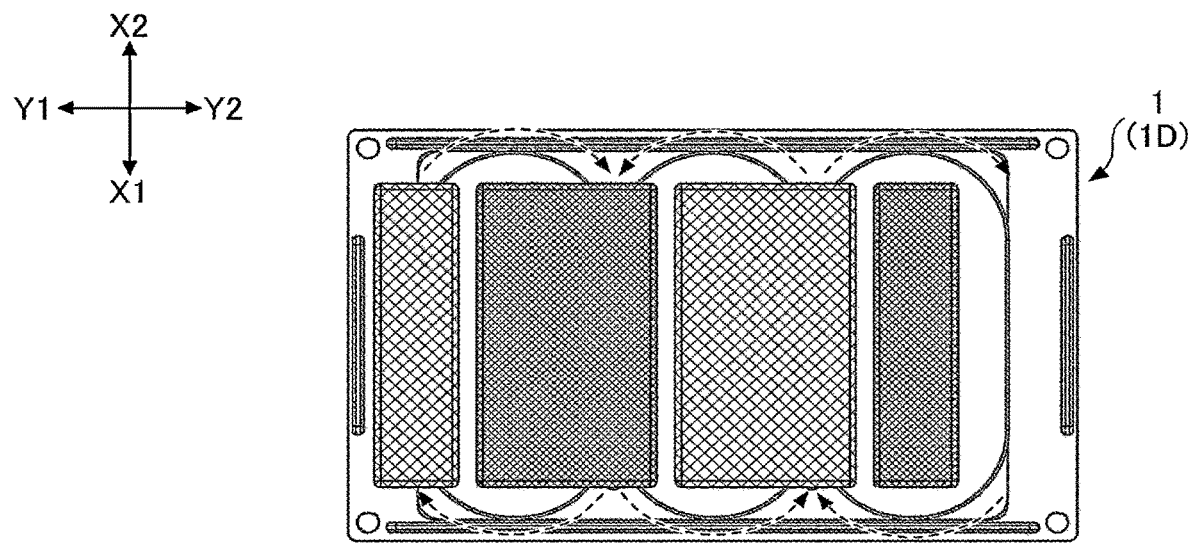
FIG. 10C is a top plan view of the lower casing, the lower coil, and the magnetic flux source.

Next, referring to FIG. 8A, FIG. 8B, FIG. 9A to FIG. 9C, and FIG. 10A to FIG. 10C, the drive member DM will be described in detail. FIG. 8A and FIG. 8B are detailed views of the coil 4 that is fixed to the housing HS as the stationary body. Specifically, FIG. 8A is a perspective view of the lower coil 4D that is fixed to the lower casing 1D. FIG. 8B is a top plan view of the lower coil 4D that is fixed to the lower casing 1D. In FIG. 8A and FIG. 8B, for ease of understanding, the lower coil 4D is given a dot pattern. FIG. 9A to FIG. 9C illustrate cross sections, as viewed from the X1 side, of the casing 1, the coil 4, and the magnetic flux source 5 in an imaginary plane parallel to the YZ plane including a chain dotted line L2 illustrated in FIG. 7A. Specifically, FIG. 9A is a cross-sectional view of the casing 1, the coil 4, and the magnetic flux source 5 when the movable body MB (magnetic flux source 5) is located at the center of the movable range. FIG. 9B is a cross-sectional view of the casing 1, the coil 4, and the magnetic flux source 5 when the movable body MB (magnetic flux source 5) is located at the right-hand end of the movable range. FIG. 9C is a cross-sectional view of the casing 1, the coil 4, and the magnetic flux source 5 when the movable body MB (magnetic flux source 5) is located at the left-hand end of the movable range. In FIG. 9A to FIG. 9C, for ease of understanding, the permanent magnet as the magnetic flux source 5 is given a rough cross pattern in the N pole thereof and a fine cross pattern in the S pole thereof, instead of a pattern representing a cross section. The same applies to other relevant drawings. FIG. 10A to FIG. 10C are top plan views of the magnetic flux source 5 that is movable, in the left-and-right direction (Y-axis direction), on the lower coil 4D fixed to the lower casing 1D. Specifically, FIG. 10A is a top plan view of the lower casing 1D, the lower coil 4D, and the magnetic flux source 5 when the movable body MB (magnetic flux source 5) is located at the center of the movable range. FIG. 10B is a top plan view of the lower casing 1D, the lower coil 4D, and the magnetic flux source 5 when the movable body MB (magnetic flux source 5) is located at the right-hand end of the movable range. FIG. 10C is a top plan view of the lower casing 1D, the lower coil 4D, and the magnetic flux source 5 when the movable body MB (magnetic flux source 5) is located at the left-hand end of the movable range.

As illustrated in FIG. 2, the coil 4, one component of the drive member DM, includes: the upper coil 4U that is fixed to a bottom (Z2-side) face of the upper casing 1U; and the lower coil 4D that is fixed to a top (Z1-side) face of the lower casing 1D.

As illustrated in FIG. 8A and FIG. 8B, the lower coil 4D includes three coils (the first lower coil 4D1, the second lower coil 4D2, and the third lower coil 4D3) that are fixed with an adhesive to the top face (Z1-side face) of the lower casing 1D. The following description given with reference to FIG. 8A and FIG. 8B is related to the lower coil 4D, but is similarly applied to the upper coil 4U as well. This is because the upper casing 1U and the lower casing 1D have the same shape and the same size and the upper coil 4U and the lower coil 4D have the same shape and the same size.

Each of the three coils forming the lower coil 4D is wound so as to surround a lower inner space 1DP. Specifically, the first lower coil 4D1 is wound so as to surround a left-hand lower inner space 1DPL, the second lower coil 4D2 is wound so as to surround a middle lower inner space 1DPC, and the third lower coil 4D3 is wound so as to surround a right-hand lower inner space 1DPR.

The first lower coil 4D1 includes: a left-hand wire bundle 4D1L that is located at a left-hand side (Y1 side) of the left-hand lower inner space 1DPL and extends along the left-hand lower inner space 1DPL; and a right-hand wire bundle 4D1R that is located at a right-hand side (Y2 side) of the left-hand lower inner space 1DPL and extends along the left-hand lower inner space 1DPL. Note that, the wire bundle means a part in which the electrically conductive wire forming the coil extends along the front-and-back direction (X-axis direction).

In FIG. 8B, for ease of understanding, the left-hand wire bundle 4D1L and the right-hand wire bundle 4D1R of the first lower coil 4D1 are given finer dot patterns than dot patterns given to the other parts in the first lower coil 4D1. The same applies to the second lower coil 4D2 and the third lower coil 4D3.

The second lower coil 4D2 includes: a left-hand wire bundle 4D2L that is located at a left-hand side (Y1 side) of the middle lower inner space 1DPC and extends along the middle lower inner space 1DPC; and a right-hand wire bundle 4D2R that is located at a right-hand side (Y2 side) of the middle lower inner space 1DPC and extends along the middle lower inner space 1DPC.

Similarly, the third lower coil 4D3 includes: a left-hand wire bundle 4D3L that is located at a left-hand side (Y1 side) of the right-hand lower inner space 1DPR and extends along the right-hand lower inner space 1DPR; and a right-hand wire bundle 4D3R that is located at a right-hand side (Y2 side) of the right-hand lower inner space 1DPR and extends along the right-hand lower inner space 1DPR.

The left-hand wire bundle 4D1L and the right-hand wire bundle 4D1R of the first lower coil 4D1 are areas through which the magnetic flux generated by the magnetic flux source 5 passes; i.e., areas where a driving force based on a Lorentz force for moving the movable body MB in the left-and-right direction is generated. The same applies to the left-hand wire bundle 4D2L and the right-hand wire bundle 4D2R of the second lower coil 4D2, and to the left-hand wire bundle 4D3L and the right-hand wire bundle 4D3R of the third lower coil 4D3.

As illustrated in FIG. 9A to FIG. 9C, the magnetic flux source 5, another component of the drive member DM, is disposed in a space between the upper coil 4U and the lower coil 4D so as to be movable in the left-and-right direction (Y-axis direction). Specifically, the magnetic flux source includes the left-hand magnet 5L, the first middle magnet 5C1, the second middle magnet 5C2, and the right-hand magnet 5R. The left-hand magnet 5L, the first middle magnet 5C1, the second middle magnet 5C2, and the right-hand magnet 5R are retained by the magnetic flux source-retaining member 6, not illustrated in FIG. 9A to FIG. 9C, in a state of being spaced from each other with predetermined intervals.

In the present embodiment, as illustrated in FIG. 9B, the left-hand magnet 5L has a width W1 that is approximately the same as a width W2 of the right-hand magnet 5R. The first middle magnet 5C1 has a width W3 that is approximately the same as a width W4 of the second middle magnet 5C2. The width W1 of the left-hand magnet 5L is approximately half the width W3 of the first middle magnet 5C1.

In the present embodiment, the six coils forming the coil 4 have the same shape and the same size. In other words, a width W5 of a left-hand wire bundle 4U1L of the first upper coil 4U1, a width W6 of a right-hand wire bundle 4U1R of the first upper coil 4U1, a width W7 of a left-hand wire bundle 4U2L of the second upper coil 4U2, a width W8 of a right-hand wire bundle 4U2R of the second upper coil 4U2, a width W9 of a left-hand wire bundle 4U3L of the third upper coil 4U3, a width W10 of a right-hand wire bundle 4U3R of the third upper coil 4U3, a width W11 of a left-hand wire bundle 4D1L of the first lower coil 4D1, a width W12 of a right-hand wire bundle 4D1R of the first lower coil 4D1, a width W13 of a left-hand wire bundle 4D2L of the second lower coil 4D2, a width W14 of a right-hand wire bundle 4D2R of the second lower coil 4D2, a width W15 of a left-hand wire bundle 4D3L of the third lower coil 4D3, and a width W16 of a right-hand wire bundle 4D3R of the third lower coil 4D3 are all the same size.

The width W1 of the left-hand magnet 5L is approximately the same as the width W5 of the left-hand wire bundle 4U1L of the first upper coil 4U1. The width W3 of the first middle magnet 5C1 is approximately the same as the total of the width W6 of the right-hand wire bundle 4U1R of the first upper coil 4U1 and the width W7 of the left-hand wire bundle 4U2L of the second upper coil 4U2.

As illustrated in FIG. 9A, when the movable body MB (magnetic flux source 5) is located at the center of the movable range, the left-hand magnet 5L is disposed such that the N pole (upper part) thereof faces the left-hand wire bundle 4U1L of the first upper coil 4U1 and the S pole (lower part) thereof faces the left-hand wire bundle 4D1L of the first lower coil 4D1. The first middle magnet 5C1 is disposed such that the S pole (upper part) thereof faces the right-hand wire bundle 4U1R of the first upper coil 4U1 and the left-hand wire bundle 4U2L of the second upper coil 4U2 and the N pole (lower part) thereof faces the right-hand wire bundle 4D1R of the first lower coil 4D1 and the left-hand wire bundle 4D2L of the second lower coil 4D2. The second middle magnet 5C2 is disposed such that the N pole (upper part) thereof faces the right-hand wire bundle 4U2R of the second upper coil 4U2 and the left-hand wire bundle 4U3L of the third upper coil 4U3 and the S pole (lower part) thereof faces the right-hand wire bundle 4D2R of the second lower coil 4D2 and the left-hand wire bundle 4D3L of the third lower coil 4D3. The right-hand magnet 5R is disposed such that the S pole (upper part) thereof faces the right-hand wire bundle 4U3R of the third upper coil 4U3 and the N pole (lower part) thereof faces the right-hand wire bundle 4D3R of the third lower coil 4D3.

When a current flows through the lower coil 4D as indicated by dashed-line arrows in FIG. 10B, the movable body MB (magnetic flux source 5) slides rightward (Y2 direction) while being guided by the guide member GM. Specifically, when the current flows through the first lower coil 4D1 counterclockwise in a top plan view thereof, the current flows through the second lower coil 4D2 clockwise in a top plan view thereof, and the current flows through the third lower coil 4D3 counterclockwise in a top plan view thereof, the movable body MB (magnetic flux source 5) slides rightward (Y2 direction).

This is because the left-hand magnet 5L, the first middle magnet 5C1, the second middle magnet 5C2, and the right-hand magnet 5R, which are serving as the magnetic flux source 5, are moved rightward by a reaction force against a Lorentz force applied to charged particles that are moving through the electrically conductive wires forming the lower coil 4D fixed to the lower casing 1D.

Similarly, when a current flows through the lower coil 4D as indicated by dashed-line arrows in FIG. 10C, the movable body MB (magnetic flux source 5) slides leftward (Y1 direction) while being guided by the guide member GM. Specifically, when the current flows through the first lower coil 4D1 clockwise in a top plan view thereof, the current flows through the second lower coil 4D2 counterclockwise in a top plan view thereof, and the current flows through the third lower coil 4D3 clockwise in a top plan view thereof, the movable body MB (magnetic flux source 5) slides leftward (Y1 direction).

As illustrated in FIG. 9B, when the movable body MB (magnetic flux source 5) moves rightward (Y2 direction), a part of the right-hand magnet 5R projects beyond a right-hand end RE of an inner face (coil 4-facing face) of the magnetic member MG. Specifically, the part of the right-hand magnet 5R projects beyond a right-hand end URE of the inner face of the upper magnetic member 1UM and projects beyond a right-hand end DRE of the inner face of the lower magnetic member 1DM. By the action of an attractive force between the right-hand magnet 5R and the magnetic member MG, a part 5Ra of the right-hand magnet 5R that projects beyond the right-hand end RE of the inner face of the magnetic member MG is attracted leftward by the right-hand end RE of the inner face of the magnetic member MG. In this state, the right-hand end RE of the inner face of the magnetic member MG is a site of the magnetic member MG that is located the closest to the part 5Ra. Note that, in FIG. 9B, parts of the lines of a magnetic force representing a magnetic field generating an attractive force to attract the right-hand magnet 5R to the magnetic member MG (lines of a magnetic force extending between the part 5Ra and the right-hand end RE) are represented by dotted lines. For simplicity, FIG. 9B does not illustrate the lines of the magnetic force representing other parts of the magnetic field generated by the magnetic flux source 5.

As illustrated in FIG. 9B, when the movable body MB (magnetic flux source 5) moves rightward (Y2 direction), a left-hand end of the magnetic member MG projects beyond a left-hand end of the left-hand magnet 5L. Specifically, left-hand ends of the upper magnetic member 1UM and the lower magnetic member 1DM project leftward of the left-hand end of the left-hand magnet 5L. By the action of an attractive force between the left-hand magnet 5L and the magnetic member MG, parts MGLa of the magnetic member MG that project leftward of the left-hand end of the left-hand magnet 5L attract the left-hand magnet 5L leftward. In this state, the left-hand end of the left-hand magnet 5L is a site of the left-hand magnet 5L that is located the closest to the parts MGLa of the magnetic member MG. Note that, in FIG. 9B, parts of the lines of a magnetic force representing a magnetic field generating an attractive force to attract the left-hand magnet 5L to the magnetic member MG (lines of a magnetic force extending between the parts MGLa and the left-hand end of the left-hand magnet 5L) are represented by dotted lines.

In this way, the movable body MB (magnetic flux source 5) displaced rightward from the center of the movable range receives such a force (attractive force) as to return the movable body MB (magnetic flux source 5) to the center of the movable range. The movable body MB (magnetic flux source 5) displaced rightward from the center of the movable range moves leftward by the force (attractive force) and returns toward the center of the movable range when a force (electromagnetic force) to move the movable body MB rightward ceases; i.e., the current flowing through the coil 4 ceases.

As illustrated in FIG. 9C, when the movable body MB (magnetic flux source 5) moves leftward (Y1 direction), a part of the left-hand magnet 5L projects beyond a left-hand end LE of an inner face (coil 4-facing face) of the magnetic member MG. By the action of an attractive force between the left-hand magnet 5L and the magnetic member MG, a part 5La of the left-hand magnet 5L that projects beyond the left-hand end LE of the inner face of the magnetic member MG is attracted rightward by the left-hand end LE of the inner face of the magnetic member MG. In this state, the left-hand end LE of the inner face of the magnetic member MG is a site of the magnetic member MG that is located the closest to the part 5La. Note that, in FIG. 9C, parts of the lines of a magnetic force representing a magnetic field generating an attractive force to attract the left-hand magnet 5L to the magnetic member MG (lines of a magnetic force extending between the part 5La and the left-hand end LE) are represented by dotted lines. For simplicity, FIG. 9C does not illustrate the lines of the magnetic force representing other parts of the magnetic field generated by the magnetic flux source 5.

As illustrated in FIG. 9C, when the movable body MB (magnetic flux source 5) moves leftward (Y1 direction), a right-hand end of the magnetic member MG projects beyond a right-hand end of the right-hand magnet 5R. Specifically, right-hand ends of the upper magnetic member 1UM and the lower magnetic member 1DM project rightward of the right-hand end of the right-hand magnet 5R. By the action of an attractive force between the right-hand magnet 5R and the magnetic member MG, parts MGRa of the magnetic member MG that project rightward of the right-hand end of the right-hand magnet 5R attract the right-hand magnet 5R rightward. In this state, the right-hand end of the right-hand magnet 5R is a site of the right-hand magnet 5R that is located the closest to the parts MGRa of the magnetic member MG. Note that, in FIG. 9C, parts of the lines of a magnetic force representing a magnetic field generating an attractive force to attract the right-hand magnet 5R to the magnetic member MG (lines of a magnetic force extending between the parts MGRa and the right-hand end of the right-hand magnet 5R) are represented by dotted lines.

In this way, the movable body MB (magnetic flux source 5) displaced leftward from the center of the movable range receives such a force (attractive force) as to return the movable body MB (magnetic flux source 5) to the center of the movable range. The movable body MB (magnetic flux source 5) displaced leftward from the center of the movable range moves rightward by the force (attractive force) and returns toward the center of the movable range when a force (electromagnetic force) to move the movable body MB leftward ceases; i.e., the current flowing through the coil 4 ceases.

Therefore, the movable body MB located at a position off the center of the movable range is returned to the center of the movable range by an attractive force between the magnetic flux source 5 and the magnetic member MG when supply of the current to the coil 4 is stopped. In this way, the drive member DM can vibrate the movable body MB in the left-and-right direction.

Figure 11:
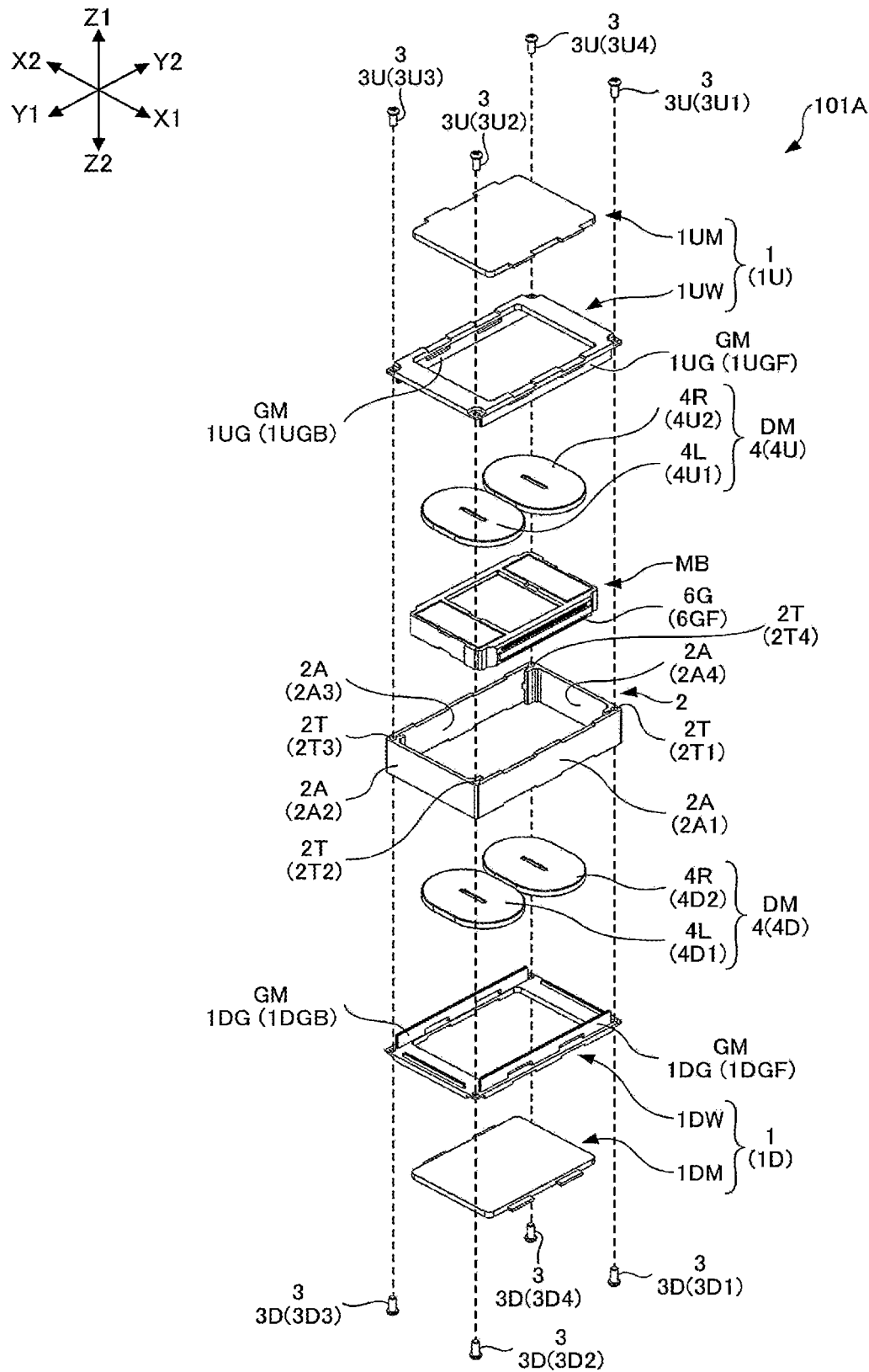
FIG. 11 is an exploded perspective view of a vibration generating device having another exemplary configuration.
Figure 12A:
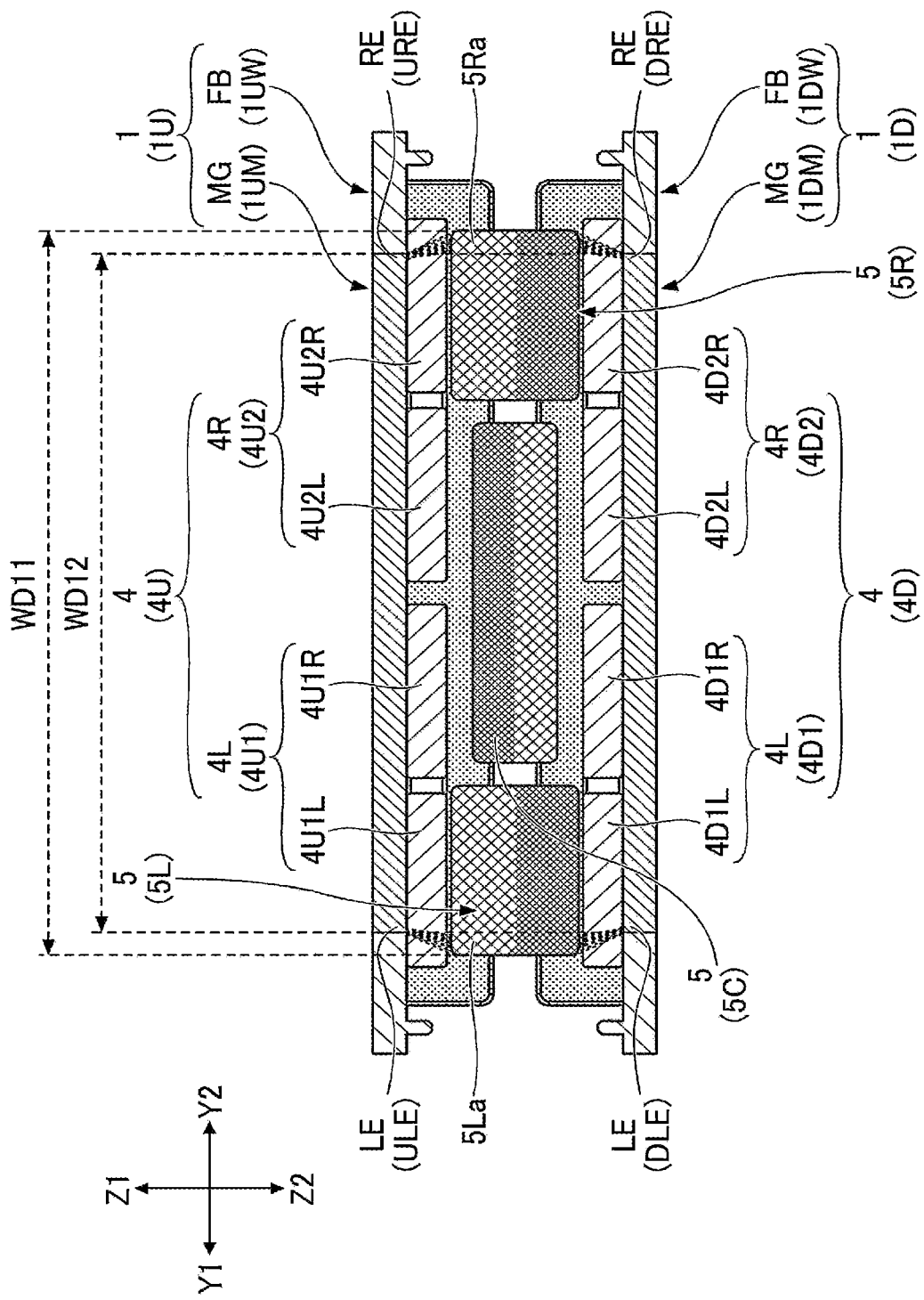
FIG. 12A is a cross-sectional view of the casing, the coil, and the magnetic flux source that form the vibration generating device as illustrated in FIG. 11.
Figure 12B:
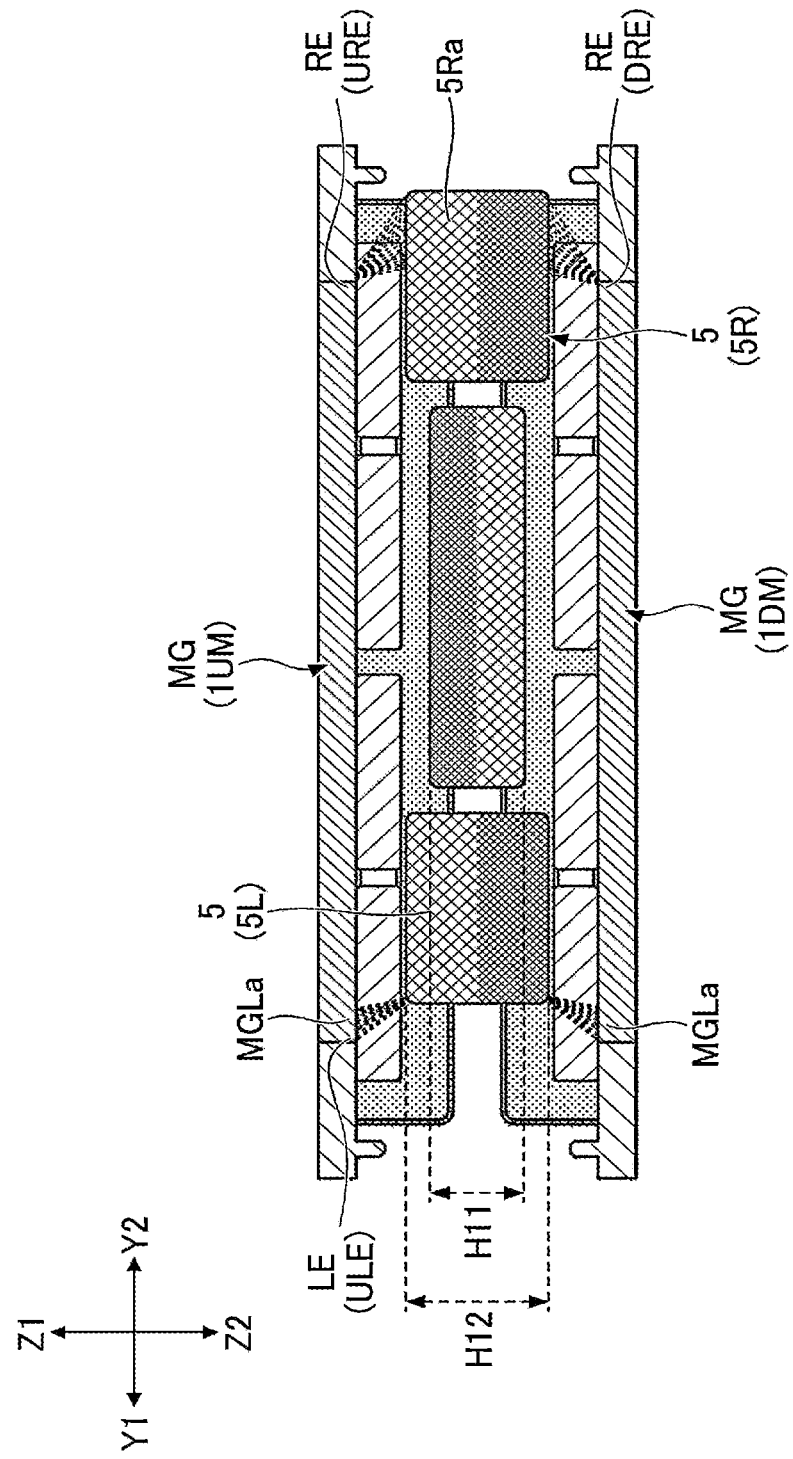
FIG. 12B is a cross-sectional view of the casing, the coil, and the magnetic flux source that form the vibration generating device as illustrated in FIG. 11.
Figure 12C:
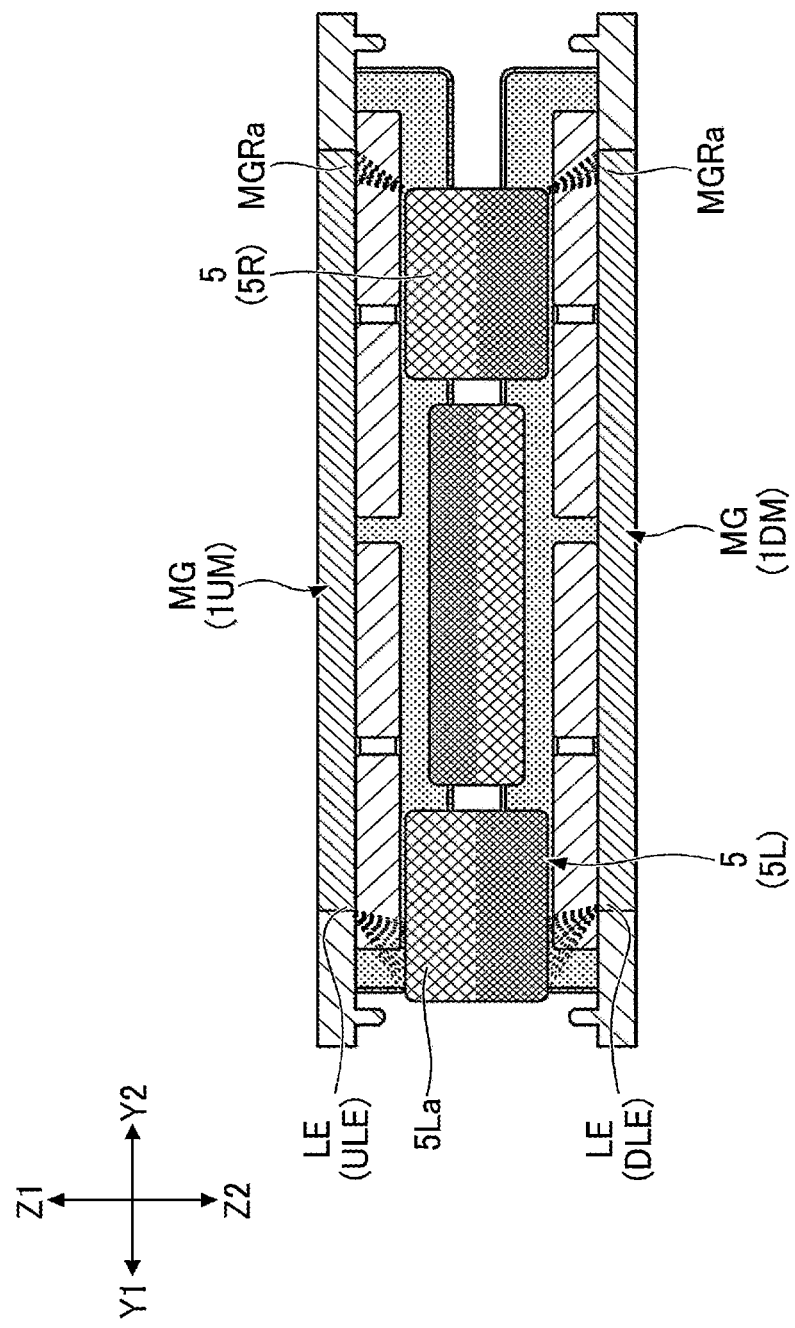
FIG. 12C is a cross-sectional view of the casing, the coil, and the magnetic flux source that form the vibration generating device as illustrated in FIG. 11.

Next, referring to FIG. 11 and FIG. 12A to FIG. 12C, a vibration generating device 101A, another configuration example of the vibration generating device 101 according to an embodiment of the present disclosure, will be described. FIG. 11, corresponding to FIG. 2, is an exploded perspective view of the vibration generating device 101A. FIG. 12A to FIG. 12C, respectively corresponding to FIG. 9A to FIG. 9C, are cross-sectional views of the casing 1, the coil 4, and the magnetic flux source 5. Specifically, FIG. 12A is a cross-sectional view of the casing 1, the coil 4, and the magnetic flux source 5 when the movable body MB (magnetic flux source 5) is located at the center of the movable range. FIG. 12B is a cross-sectional view of the casing 1, the coil 4, and the magnetic flux source 5 when the movable body MB (magnetic flux source 5) is located at the right-hand end of the movable range. FIG. 12C is a cross-sectional view of the casing 1, the coil 4, and the magnetic flux source 5 when the movable body MB (magnetic flux source 5) is located at the left-hand end of the movable range.

As illustrated in FIG. 12B, the vibration generating device 101A is different from the vibration generating device 101 in that a height H11 of the middle magnet 5C is lower than a height H12 of each of the left-hand magnet 5L and the right-hand magnet 5R; i.e., a gap (distance) between the coil 4 and the middle magnet 5C is larger than a gap (distance) between the coil 4 and each of the left-hand magnet 5L and the right-hand magnet 5R. In other words, as illustrated in FIG. 9A, the vibration generating device 101 is different from the vibration generating device 101A in that a height H1 of the middle magnet 5C is the same as a height H2 of each of the left-hand magnet 5L and the right-hand magnet 5R. With this configuration, the vibration generating device 101A can suppress unevenness in the intensity of the magnetic field passing through the wire bundles of the coil 4. As a result, when the movable body MB is displaced in the left-and-right direction, the drive member DM formed of the coil 4 and the magnetic flux source 5 can suppress reduction in the driving force (electromagnetic force) due to the unevenness in the intensity of the magnetic field passing through the wire bundles of the coil 4. In the examples as illustrated in FIG. 12A to FIG. 12C, the drive member DM can output an approximately constant driving force (electromagnetic force) regardless of an amount of displacement of the movable body MB in the left-and-right direction. This is because even when the movable body MB (magnetic flux source 5) moves in the left-and-right direction, the intensity of the magnetic field passing through the wire bundles of the coil 4 is not rapidly changed, an excessive induced electromotive force due to change in the intensity of the magnetic field (magnetic flux density) is not generated, and the movement of the movable body MB is not excessively prevented.

Also, the vibration generating device 101A is different from the vibration generating device 101 mainly in that each of the upper coil 4U and the lower coil 4D is formed of the left-hand coil 4L and the right-hand coil 4R and the middle magnet 5C is formed of one bipolar-magnetized permanent magnet. In other words, the vibration generating device 101 is different from the vibration generating device 101A mainly in that each of the upper coil 4U and the lower coil 4D includes the middle coil 4C in addition to the left-hand coil 4L and the right-hand coil 4R and the middle magnet 5C is formed of two bipolar-magnetized permanent magnets (the first middle magnet 5C1 and the second middle magnet 5C2).

Also, as illustrated in FIG. 12A, the vibration generating device 101A is different from the vibration generating device 101 in that a width WD11 of the magnetic flux source 5 is larger than a width WD12 of the magnetic member MG. In other words, as illustrated in FIG. 9A, the vibration generating device 101 is different from the vibration generating device 101A in that the WD1 of the magnetic flux source 5 is smaller than the width WD2 of the magnetic member MG.

With this configuration, in the vibration generating device 101A, even when the movable body MB (magnetic flux source 5) is located at the center of the movable range, the magnetic member MG can magnetically retain the magnetic flux source 5 in a non-contact manner by an attractive force between the magnetic flux source 5 and the magnetic member MG so that the magnetic flux source 5 does not move from the center of the movable range. This effect is also realized when the width WD11 of the magnetic flux source 5 is the same as the width WD12 of the magnetic member MG.

Specifically, by the action of an attractive force between the left-hand magnet 5L and the magnetic member MG, the part 5La of the left-hand magnet 5L that projects beyond the left-hand end LE of the inner face of the magnetic member MG is attracted rightward by the left-hand end LE of the inner face of the magnetic member MG. In this state, the left-hand end LE of the inner face of the magnetic member MG is a site of the magnetic member MG that is located the closest to the part 5La. Also, by the action of an attractive force between the right-hand magnet 5R and the magnetic member MG, the part 5Ra of the right-hand magnet 5R that projects beyond the right-hand end RE of the inner face of the magnetic member MG is attracted leftward by the right-hand end RE of the inner face of the magnetic member MG. In this state, the right-hand end RE of the inner face of the magnetic member MG is a site of the magnetic member MG that is located the closest to the part 5Ra. Note that, in FIG. 12A, parts of the lines of a magnetic force representing a magnetic field generating an attractive force to attract the left-hand magnet 5L to the magnetic member MG (lines of a magnetic force extending between the part 5La and the left-hand end LE) and parts of the lines of a magnetic force representing a magnetic field generating an attractive force to attract the right-hand magnet 5R to the magnetic member MG (lines of a magnetic force extending between the part 5Ra and the right-hand end RE) are represented by dotted lines. For simplicity, FIG. 12A does not illustrate the lines of the magnetic force representing other parts of the magnetic field generated by the magnetic flux source 5.

Note that, in the examples as illustrated in FIG. 12A to FIG. 12C, the vibration generating device 101A is configured such that when the magnetic flux source 5 is located at the center of the movable range, the strength of an attractive force to attract the left-hand magnet 5L to the magnetic member MG becomes equal to the strength of an attractive force to attract the right-hand magnet 5R to the magnetic member MG. Specifically, when the magnetic flux source 5 is located at the center of the movable range, an amount of projection of the part 5La that projects beyond the left-hand end LE of the magnetic member MG becomes equal to an amount of projection of the part 5Ra that projects beyond the right-hand end RE of the magnetic member MG.

As illustrated in FIG. 12B, when the movable body MB (magnetic flux source 5) moves rightward (Y2 direction), a part of the right-hand magnet 5R further projects beyond the right-hand end RE of the inner face of the magnetic member MG. Specifically, the part of the right-hand magnet 5R further projects beyond the right-hand end URE of the inner face of the upper magnetic member 1UM and further projects beyond the right-hand end DRE of the inner face of the lower magnetic member 1DM. By the action of an attractive force between the right-hand magnet 5R and the magnetic member MG, the part 5Ra of the right-hand magnet 5R that projects beyond the right-hand end RE of the inner face of the magnetic member MG is attracted leftward by the right-hand end RE of the inner face of the magnetic member MG. In this state, the right-hand end RE of the inner face of the magnetic member MG is a site of the magnetic member MG that is located the closest to the part 5Ra. Note that, in FIG. 12B, parts of the lines of a magnetic force representing a magnetic field generating an attractive force to attract the right-hand magnet 5R to the magnetic member MG (lines of a magnetic force extending between the part 5Ra and the right-hand end RE) are represented by dotted lines. For simplicity, FIG. 12B does not illustrate the lines of the magnetic force representing other parts of the magnetic field generated by the magnetic flux source 5.

As illustrated in FIG. 12B, when the movable body MB (magnetic flux source 5) moves rightward (Y2 direction), the left-hand end of the magnetic member MG projects beyond the left-hand end of the left-hand magnet 5L. Specifically, left-hand ends of the upper magnetic member 1UM and the lower magnetic member 1DM project leftward of the left-hand end of the left-hand magnet 5L. By the action of an attractive force between the left-hand magnet 5L and the magnetic member MG, the parts MGLa of the magnetic member MG that project leftward of the left-hand end of the left-hand magnet 5L attract the left-hand magnet 5L leftward. In this state, the left-hand end of the left-hand magnet 5L is a site of the left-hand magnet 5L that is located the closest to the parts MGLa of the magnetic member MG. Note that, in FIG. 12B, parts of the lines of a magnetic force representing a magnetic field generating an attractive force to attract the left-hand magnet 5L to the magnetic member MG (lines of a magnetic force extending between the parts MGLa and the left-hand end of the left-hand magnet 5L) are represented by dotted lines. For simplicity, FIG. 12B does not illustrate the lines of the magnetic force representing other parts of the magnetic field generated by the magnetic flux source 5.

In this way, the movable body MB (magnetic flux source 5) displaced rightward from the center of the movable range receives such a force (attractive force) as to return the movable body MB (magnetic flux source 5) to the center of the movable range. The movable body MB (magnetic flux source 5) displaced rightward from the center of the movable range moves leftward by the force (attractive force) and returns toward the center of the movable range when a force (electromagnetic force) to move the movable body MB rightward ceases; i.e., the current flowing through the coil 4 ceases.

As illustrated in FIG. 12C, when the movable body MB (magnetic flux source 5) moves leftward (Y1 direction), the part of the left-hand magnet 5L projects beyond the left-hand end LE of the inner face of the magnetic member MG. By the action of an attractive force between the left-hand magnet 5L and the magnetic member MG, the part 5La of the left-hand magnet 5L that projects beyond the left-hand end LE of the inner face of the magnetic member MG is attracted rightward by the left-hand end LE of the inner face of the magnetic member MG. In this state, the left-hand end LE of the inner face of the magnetic member MG is a site of the magnetic member MG that is located the closest to the part 5La. Note that, in FIG. 12C, parts of the lines of a magnetic force representing a magnetic field generating an attractive force to attract the left-hand magnet 5L to the magnetic member MG (lines of a magnetic force extending between the part 5La and the left-hand end LE) are represented by dotted lines. For simplicity, FIG. 12C does not illustrate the lines of the magnetic force representing other parts of the magnetic field generated by the magnetic flux source 5.

As illustrated in FIG. 12C, when the movable body MB (magnetic flux source 5) moves leftward (Y1 direction), a right-hand end of the magnetic member MG projects beyond a right-hand end of the right-hand magnet 5R. Specifically, right-hand ends of the upper magnetic member 1UM and the lower magnetic member 1DM project rightward of the right-hand end of the right-hand magnet 5R. By the action of an attractive force between the right-hand magnet 5R and the magnetic member MG, parts MGRa of the magnetic member MG that project rightward of the right-hand end of the right-hand magnet 5R attract the right-hand magnet 5R rightward. In this state, the right-hand end of the right-hand magnet 5R is a site of the right-hand magnet 5R that is located the closest to the parts MGRa of the magnetic member MG. Note that, in FIG. 12C, parts of the lines of a magnetic force representing a magnetic field generating an attractive force to attract the right-hand magnet 5R to the magnetic member MG (lines of a magnetic force extending between the parts MGRa and the right-hand end of the right-hand magnet 5R) are represented by dotted lines. For simplicity, FIG. 12C does not illustrate the lines of the magnetic force representing other parts of the magnetic field generated by the magnetic flux source 5.

In this way, the movable body MB (magnetic flux source 5) displaced leftward from the center of the movable range receives such a force (attractive force) as to return the movable body MB (magnetic flux source 5) to the center of the movable range. The movable body MB (magnetic flux source 5) displaced leftward from the center of the movable range moves rightward by the force (attractive force) and returns toward the center of the movable range when a force (electromagnetic force) to move the movable body MB leftward ceases; i.e., the current flowing through the coil 4 ceases.

Therefore, the movable body MB located at a position off the center of the movable range is returned to the center of the movable range by an attractive force between the magnetic flux source 5 and the magnetic member MG when supply of the current to the coil 4 is stopped. In this way, the drive member DM can vibrate the movable body MB in the left-and-right direction.

As described above, the vibration generating device 101 according to an embodiment of the present disclosure includes, as illustrated in, for example, FIG. 2, the housing HS as the stationary body; the movable body MB housed in the housing HS; the guide member GM that is configured to guide the movable body MB so that the movable body MB is reciprocally movable in the housing HS along the left-and-right direction; the magnetic flux source 5 as the magnetic flux-generating member that is fixed to the movable body MB and configured to generate the magnetic flux along the up-and-down direction; the coil 4 that is fixed to the housing HS so as to cross the magnetic flux generated by the magnetic flux source 5 and includes electrically conductive wires extending along the front-and-back direction and being juxtaposed along the left-and-right direction; and the magnetic member MG that is fixed to the housing HS and disposed at an outer side of the coil 4. The magnetic member MG is disposed so as to generate an attractive force to attract the movable body MB located at a position off the center of the movable range of the movable body MB, to the center of the movable range of the movable body MB. Note that, an inner side of the coil 4 is a side at which the movable body MB is present (the side facing the movable body MB), and the outer side of the coil 4 is a side opposite to the side at which the movable body MB is present.

With this configuration, the vibration generating device 101 can return the movable body MB, moved by an electromagnetic force, toward the center of the movable range by utilizing an attractive force between the magnetic flux source 5 and the magnetic member MG. Therefore, without use of a spring member or without attaching another magnet to the housing HS for a magnetic spring, the vibration generating device 101 can return the movable body MB, moved by an electromagnetic force, toward the center of the movable range.

The vibration generating device 101 may be configured such that when the movable body MB is located at the left-hand end of the movable range as illustrated in FIG. 9C, the left-hand end of the magnetic member MG is located rightward of the left-hand end of the magnetic flux source 5 (the left-hand end of the left-hand magnet 5L) and when the movable body MB is located at the right-hand end of the movable range as illustrated in FIG. 9B, the right-hand end of the magnetic member MG is located leftward of the right-hand end of the magnetic flux source 5 (the right-hand end of the right-hand magnet 5R).

However, the vibration generating device 101 may be configured such that when the movable body MB is located at the left-hand end of the movable range as illustrated in FIG. 9C, the left-hand end of the magnetic member MG is located rightward of the left-hand end of the magnetic flux source 5 (the left-hand end of the left-hand magnet 5L) but when the movable body MB is located at the right-hand end of the movable range, the right-hand end of the magnetic member MG is located at the same position as the right-hand end of the magnetic flux source 5 (the right-hand end of the right-hand magnet 5R) or is located rightward of the right-hand end of the magnetic flux source 5 (the right-hand end of the right-hand magnet 5R).

Alternatively, the vibration generating device 101 may be configured such that when the movable body MB is located at the right-hand end of the movable range as illustrated in FIG. 9B, the right-hand end of the magnetic member MG is located leftward of the right-hand end of the magnetic flux source 5 (the right-hand end of the right-hand magnet 5R) but when the movable body MB is located at the left-hand end of the movable range, the left-hand end of the magnetic member MG is located at the same position as the left-hand end of the magnetic flux source 5 (the left-hand end of the left-hand magnet 5L) or is located leftward of the left-hand end of the magnetic flux source 5 (the left-hand end of the left-hand magnet 5L).

With this configuration, when the movable body MB moves leftward or rightward of the center of the movable range, the vibration generating device 101 can push the movable body MB toward the center of the movable range by the attractive force between the magnetic flux source 5 and the magnetic member MG.

The guide member GM may be configured so as not to provide the movable body MB with a force to return to the center (hereinafter referred to as a "center-returning force"). The center-returning force is a mechanical resilient force by a mechanical element such as a spring member, and the mechanical resilient force is a force to return the movable body MB not located at the center of the movable range to the center of the movable range. Specifically, as illustrated in FIG. 7A, the movable body MB (magnetic flux source-retaining member 6) is supported by only the upper guide 1UG and the lower guide 1DG forming the guide member GM so that the movable body MB is slidable in the left-and-right direction, and no mechanical element such as a spring member is connected thereto. This is because even without providing the movable body MB with the center-returning force by a mechanical element such as a spring member, when the movable body MB moves leftward or rightward of the center of the movable range, the movable body MB is returned to the center of the movable range by the attractive force between the magnetic flux source 5 and the magnetic member MG. In other words, the movable body MB can return to the center of the movable range even without application of the center-returning force by a mechanical element such as a spring member.

With this configuration, the vibration generating device 101 can omit a mechanical element, such as a spring member, for generating the center-returning force.

The vibration generating device 101A may be configured such that when the movable body MB is located at the center of the movable range as illustrated in FIG. 12A, the left-hand end of the magnetic member MG is located rightward of the left-hand end of the magnetic flux source 5 and the right-hand end of the magnetic member MG is located leftward of the right-hand end of the magnetic flux source 5.

The vibration generating device 101A may be configured such that the movable body MB is located at the left-hand end of the movable range as illustrated in FIG. 12C, the left-hand end of the magnetic member MG is located rightward of the left-hand end of the magnetic flux source 5 (the left-hand end of the left-hand magnet 5L) and when the movable body MB is located at the right-hand end of the movable range as illustrated in FIG. 12B, the right-hand end of the magnetic member MG is located leftward of the right-hand end of the magnetic flux source 5 (the right-hand end of the right-hand magnet 5R).

However, the vibration generating device 101A may be configured such that when the movable body MB is located at the center of the movable range, the left-hand end of the magnetic member MG is located rightward of the left-hand end of the magnetic flux source 5 (the left-hand end of the left-hand magnet 5L) but the right-hand end of the magnetic member MG is located at the same position as the right-hand end of the magnetic flux source 5 (the right-hand end of the right-hand magnet 5R) or is located rightward of the right-hand end of the magnetic flux source 5 (the right-hand end of the right-hand magnet 5R).

Alternatively, the vibration generating device 101A may be configured such that when the movable body MB is located at the center of the movable range, the right-hand end of the magnetic member MG is located leftward of the right-hand end of the magnetic flux source 5 (the right-hand end of the right-hand magnet 5R) but the left-hand end of the magnetic member MG is located at the same position as the left-hand end of the magnetic flux source 5 (the left-hand end of the left-hand magnet 5L) or is located leftward of the left-hand end of the magnetic flux source 5 (the left-hand end of the left-hand magnet 5L).

With this configuration, when the movable body MB moves leftward or rightward of the center of the movable range, the vibration generating device 101 can push the movable body MB toward the center of the movable range by the attractive force between the magnetic flux source 5 and the magnetic member MG. Specifically, the vibration generating device 101A as illustrated in FIG. 12A to FIG. 12C can push the movable body MB toward the center of the movable range by an attractive force that is stronger than the attractive force between the magnetic flux source 5 and the magnetic member MG in the vibration generating device 101 as illustrated in FIG. 9A to FIG. 9C. This is because an amount of projection of the part 5La that projects beyond the left-hand end LE of the magnetic member MG and an amount of projection of the part 5Ra that projects beyond the right-hand end RE of the magnetic member MG are larger.

As illustrated in FIG. 2, the coil 4 may include the upper coil 4U disposed above the movable body MB and the lower coil 4D disposed below the movable body MB. Also, the magnetic member MG may include the upper magnetic member 1UM disposed above the movable body MB and the lower magnetic member 1DM disposed below the movable body MB.

With this configuration, the vibration generating device 101 can increase the driving force by the drive member DM while effectively utilizing a space in the housing HS. Here, either the upper coil 4U or the lower coil 4D may be omitted. Also, either the upper magnetic member 1UM or the lower magnetic member 1DM may be omitted.

The guide member GM may include a guide that includes a guide face provided in the housing HS and extending along the left-and-right direction and is configured to guide the guided part 6G so that the guided part 6G is slidable. In this case, the guided part 6G may include a face to be guided (hereinafter referred to as a "guided face") that is provided in the movable body MB and extends along the left-and-right direction.

Specifically, as illustrated in FIG. 5A, in the vibration generating device 101, the guide member GM includes: the upper front guide 1UGF and the upper back guide 1UGB that are provided on the upper casing 1U; and the lower front guide 1DGF and the lower back guide 1DGB that are provided on the lower casing 1D. The guided part 6G includes the front guided part 6GF and the back guided part 6GB that are provided on the magnetic flux source-retaining member 6 forming the movable body MB. As illustrated in FIG. 5B, the front guided part 6GF is assembled with the casing 1 so as to contact the top face FS1 as the guided face with the tip-end face FS2 of the upper front guide 1UGF as the guide face and contact the bottom face FS3 as the guided face with the tip-end face FS4 of the lower front guide 1DGF as the guide face. The same applies to the back guided part 6GB.

With this configuration, the vibration generating device 101 can realize the guide member GM with a small number of parts, the guide member GM being capable of guiding the movement of the guided part 6G in the left-and-right direction.

Specifically, the vibration generating device 101 can realize the guide member GM using the upper casing 1U and the lower casing 1D.

Also, as illustrated in, for example, FIG. 2, the vibration generating device 101 according to an embodiment of the present disclosure includes: the housing HS as the stationary body including the upper casing 1U and the lower casing 1D (see FIG. 1A); the movable body MB housed in the space between the upper casing 1U and the lower casing 1D; the guide member GM that is configured to guide the movable body MB so that the movable body MB is reciprocally movable in the housing HS along the left-and-right direction; the magnetic flux source 5 fixed to one of the movable body MB and the housing HS (the movable body MB in the example as illustrated in FIG. 2); the coil 4 fixed to the other of the movable body MB and the housing HS (the housing HS in the example as illustrated in FIG. 2); and the drive member DM that is configured to provide the movable body MB with a driving force in the left-and-right direction.

As illustrated in, for example, FIG. 5A, the guide member GM includes: the upper guide 1UG that is integrally formed with the upper casing 1U and extends downward from the upper casing 1U; and the lower guide 1DG that is integrally formed with the lower casing 1D and extends upward from the lower casing 1D. Also, the guide member GM is configured such that the guided part 6G provided in the movable body MB (magnetic flux source-retaining member 6) is guided so that the guided part 6G is slidable along the left-and-right direction by the upper guide 1UG and the lower guide 1DG.

This vibration generating device 101 forms the guide member GM by utilizing a part of the upper casing 1U and a part of the lower casing 1D. Therefore, it is possible to suppress an increase in the number of parts while forming the guide member GM that is configured to guide the movable body MB so that the movable body MB is reciprocally movable in the housing HS in the left-and-right direction. Also, this configuration can suppress an increase in the size of the vibration generating device 101.

As illustrated in FIG. 5B, the guide member GM is configured such that the guided part 6G is guided in the space between the upper guide 1UG and the lower guide 1DG so that the guided part 6G is slidable along the left-and-right direction.

Specifically, as illustrated in, for example, FIG. 5A, the upper guide 1UG may include: the upper front guide 1UGF at the front side of the upper casing 1U; and the upper back guide 1UGB at the back side of the upper casing 1U. Also, the lower guide 1DG may include: the lower front guide 1DGF at the front side of the lower casing 1D; and the lower back guide 1DGB at the back side of the lower casing 1D. The guided part 6G may include the front guided part 6GF at the front side of the magnetic flux source-retaining member 6 forming the movable body MB; and the back guided part 6GB at the back side of the magnetic flux source-retaining member 6 forming the movable body MB.

More specifically, the magnetic flux source-retaining member 6 may include the projected front guided part 6GF that is formed so as to project forward from a front face thereof, so that the projected front guided part 6GF is fitted into a recessed space having a generally cuboid shape, the recessed space being formed between the tip-end part of the upper front guide 1UGF and the tip-end part of the lower front guide 1DGF. Also, the magnetic flux source-retaining member 6 may include the projected back guided part 6GB that is formed so as to project backward from a back face thereof, so that the projected back guided part 6GB is fitted into a recessed space having a generally cuboid shape, the recessed space being formed between the tip-end part of the upper back guide 1UGB and the tip-end part of the lower back guide 1DGB.

In this configuration, the guide member GM can suppress the movement of the guided part 6G in any directions other than the left-and-right direction (Y-axis direction). In other words, the guide member GM can suppress the movable body MB from moving in the front-and-back direction (X-axis direction) and in the up-and-down direction (Z-axis direction).

The housing HS may include the hollow cylindrical side casing 2 that is open at the top and bottom thereof. In this case, as illustrated in FIG. 5A and FIG. 6A, the housing HS may be configured such that the upper casing 1U is positioned so as to contact the top end of the side casing 2 from above the side casing 2 and such that the lower casing 1D is positioned so as to contact the bottom end of the side casing 2 from below the side casing 2.

This configuration makes it possible to highly precisely form a desired size of the recessed space between the tip-end part of the upper back guide 1UGB and the tip-end part of the lower back guide 1DGB. Therefore, this configuration can realize smooth sliding of the movable body MB in the left-and-right direction.

Desirably, the upper casing 1U and the lower casing 1D have the same shape and the same size. This can further reduce the number of parts forming the vibration generating device 101.

Also, as illustrated in, for example, FIG. 2, the vibration generating device 101 according to an embodiment of the present disclosure includes: the housing HS as the stationary body (see FIG. 1A); the movable body MB housed in the housing HS; the guide member GM that is configured to guide the movable body MB so that the movable body MB is reciprocally movable in the housing HS along the left-and-right direction; the magnetic flux source 5 that is fixed to one of the movable body MB and the housing HS (the movable body MB in the example as illustrated in FIG. 2) and is configured to generate the magnetic flux along the up-and-down direction; and the coil 4 that is fixed to the other of the movable body MB and the housing HS (the housing HS in the example as illustrated in FIG. 2) so as to cross the magnetic flux generated by the magnetic flux source 5 and includes electrically conductive wires extending along the front-and-back direction and being juxtaposed along the left-and-right direction.

As illustrated in, for example, FIG. 3A and FIG. 3B, the magnetic flux source 5 includes the left-hand magnet 5L, at least one of the middle magnet 5C, and the right-hand magnet 5R. The left-hand magnet 5L, the at least one of the middle magnet 5C, and the right-hand magnet 5R are juxtaposed along the left-and-right direction.

As illustrated in FIG. 9A, the coil 4 includes: the left-hand wire bundle crossing the magnetic flux from the left-hand magnet 5L; the left-hand coil 4L formed of the right-hand wire bundle crossing the magnetic flux from the middle magnet 5C; the left-hand wire bundle crossing the magnetic flux from the middle magnet 5C; and the right-hand coil 4R formed of the right-hand wire bundle crossing the magnetic flux from the right-hand magnet 5R.

As illustrated in FIG. 12A to FIG. 12C, the vibration generating device 101A, another configuration example of the vibration generating device 101, is configured such that the magnetic fluxes from the middle magnet 5C that penetrate, in the up-and-down direction, a space between the right-hand wire bundle of the left-hand coil 4L and the middle magnet 5C become less than the magnetic fluxes from the left-hand magnet 5L that penetrate, in the up-and-down direction, a space between the left-hand wire bundle of the left-hand coil 4L and the left-hand magnet 5L, and the magnetic fluxes from the middle magnet 5C that penetrate, in the up-and-down direction, a space between the right-hand wire bundle of the right-hand coil 4R and the middle magnet 5C become less than the magnetic fluxes from the right-hand magnet 5R that penetrate, in the up-and-down direction, a space between the right-hand wire bundle of the right-hand coil 4R and the right-hand magnet 5R.

Desirably, the vibration generating device 101A is configured such that the magnetic fluxes passing the wire bundles forming the coil 4 become approximately uniform between the wire bundles by appropriately setting at least one of, for example, the width of the middle magnet 5C, the height thereof (distance between the middle magnet 5C and the coil 4), the depth thereof, and the magnetic force thereof.

This configuration can suppress the intensity of the magnetic field passing through the coil 4 from becoming non-uniform from position to position regardless of a relative positional relationship between the coil 4 and the magnetic flux source 5. Specifically, this configuration can suppress the magnetic fluxes passing through the wire bundles of the coil 4 from becoming non-uniform between the wire bundles. Therefore, this configuration can suppress, when the movable body MB moves in the left-and-right direction, hindrance of the movement toward a desired direction due to an induced electromotive force generated through electromagnetic induction as a result of change in the intensity of the magnetic field passing through the specific wire bundles in the coil 4. This means that as compared with a configuration in which the intensity of the magnetic field passing through the coil 4 is not uniform from position to position, the vibration generating device 101A can realize a larger driving force with the same power consumption or can reduce the power consumption for realizing the same driving force.

For example, as illustrated in FIG. 12A to FIG. 12C, the magnetic flux source 5 may be configured such that a thickness of the middle magnet 5C in the up-and-down direction becomes smaller than a thickness of the left-hand magnet 5L in the up-and-down direction and a thickness of the right-hand magnet 5R in the up-and-down direction. In other words, the magnetic flux source 5 may be configured such that a gap between the coil 4 and the middle magnet 5C becomes larger than a gap between the coil 4 and each of the left-hand magnet 5L and the right-hand magnet 5R. This is for suppressing the intensity of the magnetic field passing through the wire bundles of the coil 4 from becoming non-uniform from position to position by reducing the magnetic fluxes generated by the middle magnet 5C of the magnetic fluxes passing through the wire bundles of the coil 4.

This configuration is based on the finding that when the thickness of the middle magnet 5C in the up-and-down direction is the same as the thickness of each of the left-hand magnet 5L and the right-hand magnet 5R in the up-and-down direction, the magnetic fluxes generated by the middle magnet 5C of the magnetic fluxes passing through the wire bundles of the coil 4 are more than the magnetic fluxes generated by each of the left-hand magnet 5L and the right-hand magnet 5R. Note that, in order to realize similar effects, the magnetic flux source may be configured such that a width dimension of the middle magnet 5C in the left-and-right direction becomes smaller than a width dimension of the left-hand coil 4L in the left-and-right direction or such that a depth dimension of the middle magnet 5C in the front-and-back direction becomes smaller than a depth dimension of the wire bundle of the coil 4. Alternatively, the magnetic flux source 5 may be configured such that a magnetic force of the middle magnet 5C becomes smaller than a magnetic force of each of the left-hand magnet 5L and the right-hand magnet 5R.

Also, this configuration can more reliably suppress the intensity of the magnetic field passing through the coil 4 from becoming non-uniform from position to position as compared with the case in which the magnetic flux source 5 is configured such that the width of the middle magnet 5C in the left-and-right direction becomes smaller than the width of each of the left-hand magnet 5L and the right-hand magnet 5R in the left-and-right direction. In this configuration, the width of each of the left-hand magnet 5L, the middle magnet 5C, and the right-hand magnet 5R in the left-and-right direction can be made consistent with the width of the wire bundle of the coil 4 in the left-and-right direction.

Also, as illustrated in FIG. 12A, the magnetic flux source 5 may be configured such that the middle magnet 5C has a width dimension in the left-and-right direction that is approximately twice that of the left-hand magnet 5L in the left-and-right direction, and configured to generate the magnetic flux toward the right-hand wire bundle of the left-hand coil 4L and the left-hand wire bundle of the coil next to and rightward of the left-hand coil 4L (right-hand coil 4R).

This configuration can reduce the number of parts forming the vibration generating device 101 as compared with the case in which the middle magnet 5C is formed of two magnets arranged side by side each having the same left-right width as the left-hand coil 4L.

The embodiments of the present disclosure have been described above in detail. However, the present disclosure should not be construed as being limited to the above-described embodiments. Various modifications, substitutions, and the like can be applied to the above-described embodiments without departing from the scope of the present disclosure. The features described with reference to the above-described embodiments may be appropriately combined together unless there is any technical contradiction.

For example, in the above-described embodiments, the lower casing 1D, the upper casing 1U, and the side casing 2 are formed as mutually independent individual members. However, the side casing 2 may be integrally formed with the lower casing 1D or the upper casing 1U. For example, the upper casing 1U and the side casing 2 may be integrally formed as a single part.

Also, the upper guide 1UG and the lower guide 1DG may be formed so as to face the second side plate 2A2 and the fourth side plate 2A4, respectively. In this case, the guided part 6G may be formed at the left-hand end and the right-hand end of the movable body MB. For example, the guided part 6G may be a combination of a rod member projecting leftward from the left-hand end of the magnetic flux source-retaining member 6 and a rod member projecting rightward from the right-hand end of the magnetic flux source-retaining member 6. In this case, the guide member GM may be configured such that the upper guide 1UG includes an upper right guide and an upper left guide, and the lower guide 1DG includes a lower right guide and a lower left guide. The rod member projecting leftward from the left-hand end of the magnetic flux source-retaining member 6 may be supported between the tip-end part of the upper left guide and the tip-end part of the lower left guide such that the rod member is slidable therebetween. The rod member projecting rightward from the right-hand end of the magnetic flux source-retaining member 6 may be supported between the tip-end part of the upper right guide and the tip-end part of the lower right guide such that the rod member is slidable therebetween. Alternatively, the rod member projecting leftward from the left-hand end of the magnetic flux source-retaining member 6 may be inserted into a guide hole that is formed in the upper left guide, the lower left guide, or both. The rod member projecting rightward from the right-hand end of the magnetic flux source-retaining member 6 may be inserted into a guide hole that is formed in the upper right guide, the lower right guide, or both.

Also, in the above-described embodiments, the magnetic flux source-retaining member 6 includes the projected front guided part 6GF that is formed so as to project forward from a front face thereof, so that the projected front guided part 6GF is fitted into a recessed space having a generally cuboid shape, the recessed space being formed between the tip-end part of the upper front guide 1UGF and the tip-end part of the lower front guide 1DGF. Also, the magnetic flux source-retaining member 6 includes the projected back guided part 6GB that is formed so as to project backward from a back face thereof, so that the projected back guided part 6GB is fitted into a recessed space having a generally cuboid shape, the recessed space being formed between the tip-end part of the upper back guide 1UGB and the tip-end part of the lower back guide 1DGB. However, the magnetic flux source-retaining member 6 may include a recessed guided part instead of the projected guided part 6G. For example, the magnetic flux source-retaining member 6 may include a recessed front guided part instead of the projected front guided part 6GF. In this case, the tip-end part of each of the upper front guide 1UGF and the lower front guide 1DGF may be formed so as to be folded inside and engaged with the recessed front guided part. The same applies to the back guided part 6GB.

Also, in the above-described embodiments, the vibration generating device 101 is configured such that the coil axis of the coil 4 is perpendicular to a direction in which the magnetic flux source 5 moves. However, the vibration generating device 101 may be configured such that the coil axis of the coil 4 is parallel to the direction in which the magnetic flux source 5 moves.

Also, in the above-described embodiments, the coil 4 includes: the upper coil 4U that is fixed to the lower face of the upper casing 1U; and the lower coil 4D that is fixed to the upper face of the lower casing 1D. However, any one of the upper coil 4U and the lower coil 4D may be omitted.

The above-described vibration generating device can return the movable body, which has been moved by the action of an electromagnetic force, toward the initial position without using a spring member.

What is claimed is:

1. A vibration generating device, comprising:
    a stationary body;
    a movable body housed in the stationary body;
    a guide member that is configured to guide the movable body so that the movable body is reciprocally movable in the stationary body along a left-and-right direction;
    a magnetic flux-generating member that is fixed to the movable body and configured to generate a magnetic flux along an up-and-down direction;
    a coil that is fixed to the stationary body so as to cross the magnetic flux and includes electrically conductive wires extending along a front-and-back direction and being juxtaposed along the left-and-right direction; and
    a magnetic member that is fixed to the stationary body and disposed at an outer side of the coil,
    wherein the magnetic member is disposed so as to generate an attractive force, between the magnetic member and the magnetic flux-generating member, to attract the movable body located at a position off a center of a movable range of the movable body, to the center of the movable range of the movable body, said movable range of the movable body being defined as a range in which the movable body moves by a Lorentz force,
    wherein either (1) or (2) below is true or both (1) and (2) below are true:
    (1) with the movable body being located at a left-hand end of the movable range, a left-hand end of the magnetic member is located rightward of a left-hand end of the magnetic flux-generating member, and
    (2) with the movable body being located at a right-hand end of the movable range, a right-hand end of the magnetic member is located leftward of a right-hand end of the magnetic flux-generating member.

2. The vibration generating device according to claim 1, wherein the guide member does not provide the movable body with a force to return to the center.

3. The vibration generating device according to claim 1, wherein:
    the coil includes an upper coil disposed above the movable body, and a lower coil disposed below the movable body, and
    the magnetic member includes an upper magnetic member disposed above the movable body, and a lower magnetic member disposed below the movable body.

4. The vibration generating device according to claim 1, wherein:
    the guide member includes a guide that has a guide face and is configured to guide a guided part so that the guided part is slidable, the guide face being provided in the stationary body and extending along the left-and-right direction, and
    the guided part has a guided face that is provided in the movable body and extends along the left-and-right direction.

5. The vibration generating device according to claim 1, wherein the magnetic flux-generating member comprises a plurality of permanent magnets,
    each of the permanent magnets being bipolar-magnetized in the up-and-down direction, and
    the plurality of permanent magnets being juxtaposed along the left-and-right direction such that different magnetic poles are adjacent to each other.

6. A vibration generating device, comprising:
    a stationary body;
    a movable body housed in the stationary body;
    a guide member that is configured to guide the movable body so that the movable body is reciprocally movable in the stationary body along a left-and-right direction;
    a magnetic flux-generating member that is fixed to the movable body and configured to generate a magnetic flux along an up-and-down direction;
    a coil that is fixed to the stationary body so as to cross the magnetic flux and includes electrically conductive wires extending along a front-and-back direction and being juxtaposed along the left-and-right direction; and
    a magnetic member that is fixed to the stationary body and disposed at an outer side of the coil,
    wherein the magnetic member is disposed so as to generate an attractive force, between the magnetic member and the magnetic flux-generating member, to attract the movable body located at a position off a center of a movable range of the movable body, to the center of the movable range of the movable body, said movable range of the movable body being defined as a range in which the movable body moves by a Lorentz force,
    wherein either (1) or (2) below is true or both (1) and (2) below are true:
    (1) a left-hand end of the magnetic member is located rightward of a left-hand end of the magnetic flux-generating member in a state of the movable body being located at the center of the movable range, and
    (2) a right-hand end of the magnetic member is located leftward of a right-hand end of the magnetic flux-generating member in a state of the movable body being located at the center of the movable range.

7. The vibration generating device according to claim 6, wherein the guide member does not provide the movable body with a force to return to the center.

8. The vibration generating device according to claim 6, wherein:
    the coil includes an upper coil disposed above the movable body, and a lower coil disposed below the movable body, and
    the magnetic member includes an upper magnetic member disposed above the movable body, and a lower magnetic member disposed below the movable body.

9. The vibration generating device according to claim 6, wherein:
    the guide member includes a guide that has a guide face and is configured to guide a guided part so that the guided part is slidable, the guide face being provided in the stationary body and extending along the left-and-right direction, and
    the guided part has a guided face that is provided in the movable body and extends along the left-and-right direction.

10. The vibration generating device according to claim 6, wherein the magnetic flux-generating member comprises a plurality of permanent magnets,
    each of the permanent magnets being bipolar-magnetized in the up-and-down direction, and
    the plurality of permanent magnets being juxtaposed along the left-and-right direction such that different magnetic poles are adjacent to each other.

* * * * *